(12) United States Patent
Kawai et al.

(10) Patent No.: US 7,190,967 B2
(45) Date of Patent: Mar. 13, 2007

(54) RADIO COMMUNICATION SYSTEM, COMMUNICATION TERMINAL, AND METHOD FOR TRANSMITTING BURST SIGNALS

(75) Inventors: Hiroyuki Kawai, Yokosuka (JP); Shinzo Ohkubo, Yokosuka (JP); Toru Otsu, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 677 days.

(21) Appl. No.: 10/223,414

(22) Filed: Aug. 20, 2002

(65) Prior Publication Data

US 2003/0040283 A1 Feb. 27, 2003

(30) Foreign Application Priority Data

Aug. 21, 2001 (JP) ............................. 2001-250498

(51) Int. Cl.
H04B 7/05 (2006.01)
(52) U.S. Cl. .................. 455/550.1; 455/226.2
(58) Field of Classification Search ............. 455/69, 455/522, 115.3, 226.3, 452.2, 266, 72, 242.2, 455/231, 226.1, 1, 2, 3, 134–135, 425, 550.1
See application file for complete search history.

(56) References Cited

U.S. PATENT DOCUMENTS

| 5,606,580 | A | 2/1997 | Mourot et al. | |
|---|---|---|---|---|
| 6,240,077 | B1 * | 5/2001 | Vuong et al. | 370/330 |
| 6,256,478 | B1 | 7/2001 | Allen et al. | |
| 2001/0053142 | A1 * | 12/2001 | Abe et al. | 370/337 |
| 2002/0154688 | A1 * | 10/2002 | Pollmann et al. | 375/229 |
| 2004/0202191 | A1 * | 10/2004 | Vrabel | 370/412 |
| 2005/0028065 | A1 * | 2/2005 | Halter | 714/755 |

FOREIGN PATENT DOCUMENTS

| EP | 0 197 545 | 10/1986 |
|---|---|---|
| EP | 1 162 766 | 12/2001 |
| JP | 11-355253 | 12/1999 |
| JP | 2000-165290 | 6/2000 |
| KR | 2000-37706 | 7/2000 |
| WO | WO 99/18685 | 4/1999 |
| WO | WO 01/48952 | 7/2001 |

* cited by examiner

*Primary Examiner*—Edan Orgad
*Assistant Examiner*—Tu X. Nguyen
(74) *Attorney, Agent, or Firm*—Oblon, Spivak, McClelland, Maier & Neustadt, P.C.

(57) ABSTRACT

In a burst signal transmitting/receiving method with transmission availability control, a method is provided for transmitting each burst signal with the transmission unit length appropriate for the transmission path condition at the time. Radio transmission path condition between a transmitting station and a receiving station is measured. A period during which the burst signal is to be transmitted is then determined on the basis of the measured radio transmission path condition. Before transmitted, the length of the burst signal is adjusted such that it is accommodated in such period.

17 Claims, 21 Drawing Sheets

FIG.18

(a) BURST SIGNAL LENGTH 1801

BURST SIGNAL LENGTH 1802

(b) BURST SIGNAL LENGTH 1801

(c) TRANSMISSION AVAILABLE PERIOD 1803a | 1803b | 1803c
t11  t12  t13  t14  t15  t16 → TIME (d) TRANSMISSION UNIT 1804a  TERMINAL SIGNAL 1805a  1805b  1804b 1805c  1805d 1804c
t11  t12  t13  t14  t15  t16 → TIME

RADIO COMMUNICATION SYSTEM, COMMUNICATION TERMINAL, AND METHOD FOR TRANSMITTING BURST SIGNALS

BACKGROUND OF THE INVENTION

1. Field of the Invention

The present invention relates to a method for transmitting burst signals in a radio communication system, and more particularly to a method and apparatus for appropriately-dividing and/or combining the burst signals to be transmitted, and for transmitting the burst signals only during a period when the radio transmission path condition is fine, on the basis of the radio transmission path condition between a transmitting station and a receiving station, and of the transmission waiting status of burst signals at the transmitting station.

2. Description of the Related Art

As a conventional method for transmitting burst signals in the radio communication system, International Publication WO01/48952A1 discloses controlling transmission availability of burst signal.

This measures a time-averaged condition and an instantaneous condition on the radio transmission path between the transmitting station and the receiving station, and controls the burst signal transmission to be available only when the instantaneous condition is better than the time-averaged condition in order to reduce peak transmission power or average transmission power and thereby to reduce power consumption at the transmitting station and interference to other receiving stations.

However, the above conventional method performs the burst signal transmission availability control in units of a burst signal. Thus, it causes a problem in that, in the case in which the variation cycle between fine/not fine conditions of the radio transmission path is shorter than the burst signal length, the signal may be transmitted under the circumstances that the transmission path condition is not fine.

For example, in the case of performing the above conventional transmission availability control using measured instantaneous value of path loss variation as a parameter indicating the radio transmission path condition, or in the case in which the measured instantaneous value of path loss varies quickly and a period for transmission allowed is shorter than the burst signal length, only a period where the measured instantaneous value of path loss variation is large (i.e. where it is determined that the transmission path condition is relatively better) may be insufficient to complete the transmission of burst signal. Then, the burst signal has to be transmitted not only during the period under better condition but also during a period where the measured instantaneous value of path loss variation is small (i.e. where it is determined that the transmission path condition is relatively worse), reducing advantages of the transmission availability control.

Also, the above conventional burst signal transmission availability control causes another problem in that it keeps operating the processes associated with this control even when the variation cycle of the transmission path condition is very short, and thereby the resultant advantages are decreased.

Further, the above conventional burst signal transmission availability control causes another problem in that, in the case in which the variation cycle of the transmission path condition is very long, a transmission unavailable period is caused to be long, and thereby the transmission waiting time for the burst signals to be transmitted, which are accumulated during such transmission unavailable period, will be long, and large delay will occur.

Thus, according to the conventional transmission availability control, since the control is performed in units of the burst signal, and is always performed regardless of how long the variation cycle of the transmission path condition is, it may be possible that the advantages to be obtained by the control cannot be sufficiently obtained.

SUMMARY OF THE INVENTION

The present invention is directed to solve these problems, and its object is to provide a method, a system and an apparatus for transmitting each burst signal with the transmission unit length appropriate for the transmission path condition at the time, with the burst signals transmitting/receiving method for performing the transmission availability control of the burst signals on the basis of the radio transmission path condition.

One aspect of the present invention is a method for transmitting burst signals in a radio communication system comprising a transmitting station and a receiving station, the transmitting station comprising a measurement part for measuring radio transmission path condition between the transmitting station and the receiving station, wherein the transmitting station adjusts the signal length of the burst signal to be transmitted on the basis of the measured result by the measurement part.

In this aspect, the above-described radio transmission path condition may be defined by one of the following parameters or a combination thereof: measured instantaneous value of path loss variation; transmission error rate; transmission throughput; distance between the transmitting station and the receiving station; power of interference from other stations; the number of other receiving stations that intend to receive signals from an antenna of the transmitting station; amount of information to be transmitted; an average thereof; desired transmission time; relative physical relationship between the transmitting station and the receiving station; and so on.

According to this aspect, the burst signal can be transmitted with a desired signal length after adjustment of its signal length on the basis of the radio transmission path condition, rather than being transmitted in units of the burst signal.

Alternatively, the burst signal transmitting method according to the present invention can select one desired transmission unit length from a set of a plurality of predetermined different unit lengths, and adjust the length of the burst signal to be transmitted to the selected unit length.

The burst signal transmitting method according to the present invention can also adjust the length of the burst signal to be transmitted to a fixed unit length.

BRIEF DESCRIPTION OF THE DRAWINGS

These and other aspects, and other objects, features and advantages of the present invention will become more apparent from the following detailed description when read in conjunction with the accompanying drawings, in which:

FIG. 18 is a diagram schematically showing an outline of burst signal processing according to a seventh embodiment of the present invention;

DETAILED DESCRIPTION OF THE PREFERRED EMBODIMENTS

In a burst-signal transmission method for performing transmission availability control of burst signals on the basis of radio transmission path condition, the present invention is a control method intended to transmit the burst signals (e.g. packet data) only under the circumstances that the transmission path condition is fine.

First, transmission availability control according to the present invention is outlined hereinafter with reference to FIGS. 1–4.

Figure 1:
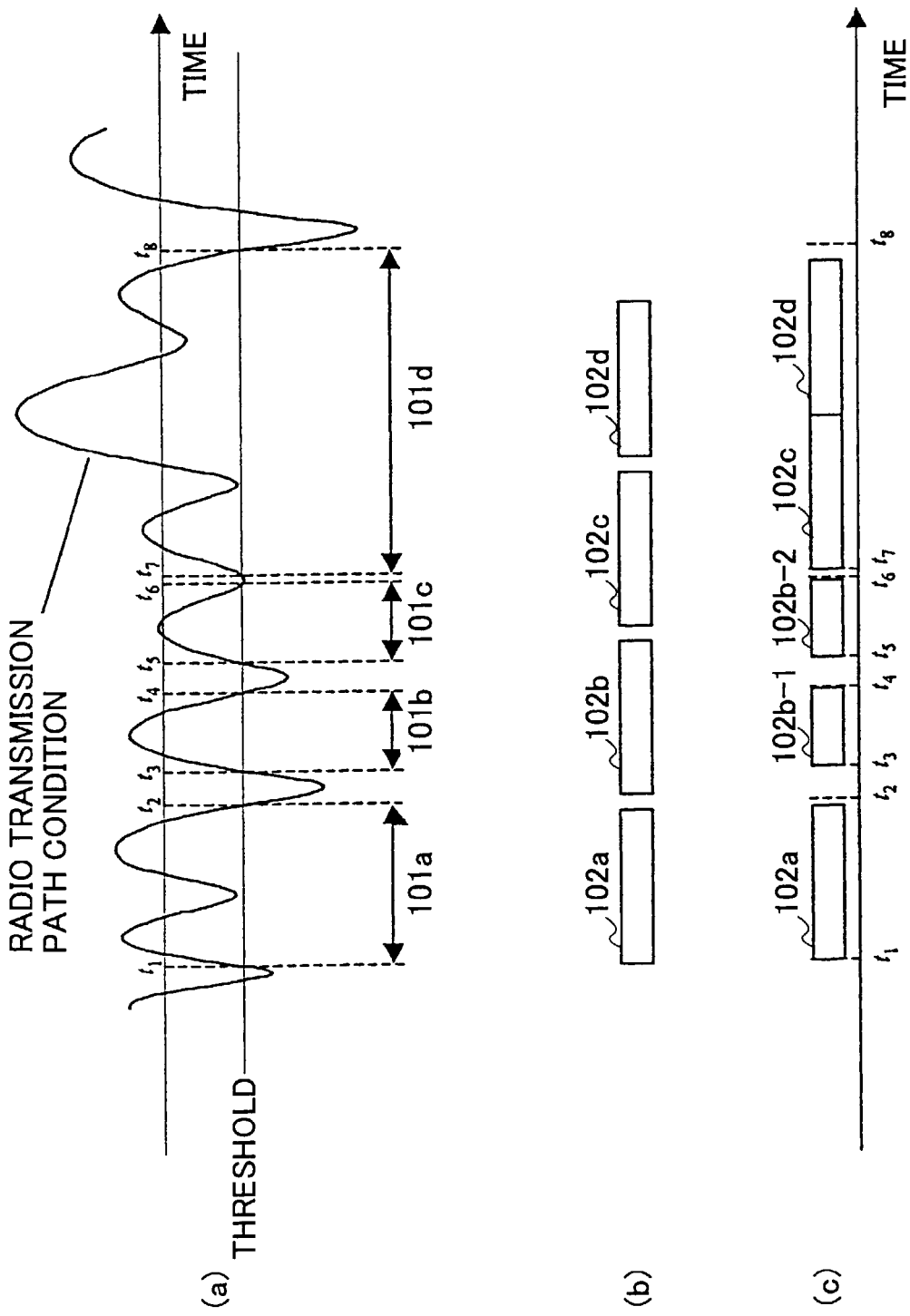
FIG. 1 is a diagram schematically showing a first aspect of the transmission availability control according to the present invention.

FIG. 1 schematically shows the first aspect of transmission availability control according to the present invention. In this aspect, when the transmission availability control determines that the radio transmission path condition is fine, it adaptively divides and/or combines the burst signals to be transmitted on the basis of the length of the transmission allowed period for the burst signals (hereinafter refer to as transmission available period), and transmits the burst signals during such transmission available period. In other words, in this aspect, since the burst signals are directly divided/combined on the basis of the transmission path condition, the transmission of the burst signals starts when it is determined that the transmission is allowed, and suspends when it is determined that the transmission is not allowed.

As an example shown in FIG. 1(a), by predefining a threshold for the instantaneous radio transmission path condition, transmission available periods 101a–101d are set out. It is here assumed that a set of burst signals 102a–102d shown in FIG. 1(b) is to be transmitted. Then, the burst signals are divided and combined, as shown in FIG. 1(c), on the basis of the lengths of the transmission available periods 101a–101d.

In this example, the burst signal 102a is directly (i.e. not divided or combined) transmitted during the transmission available period 101a, the burst signal 102b is divided into the signal 102b-1 and the signal 102b-2, which are then transmitted respectively during the transmission available period 101b and the transmission available period 10c, and the burst signals 102c and 102d are combined into one, which is then transmitted during the transmission available period 101d at a time.

Figure 2:
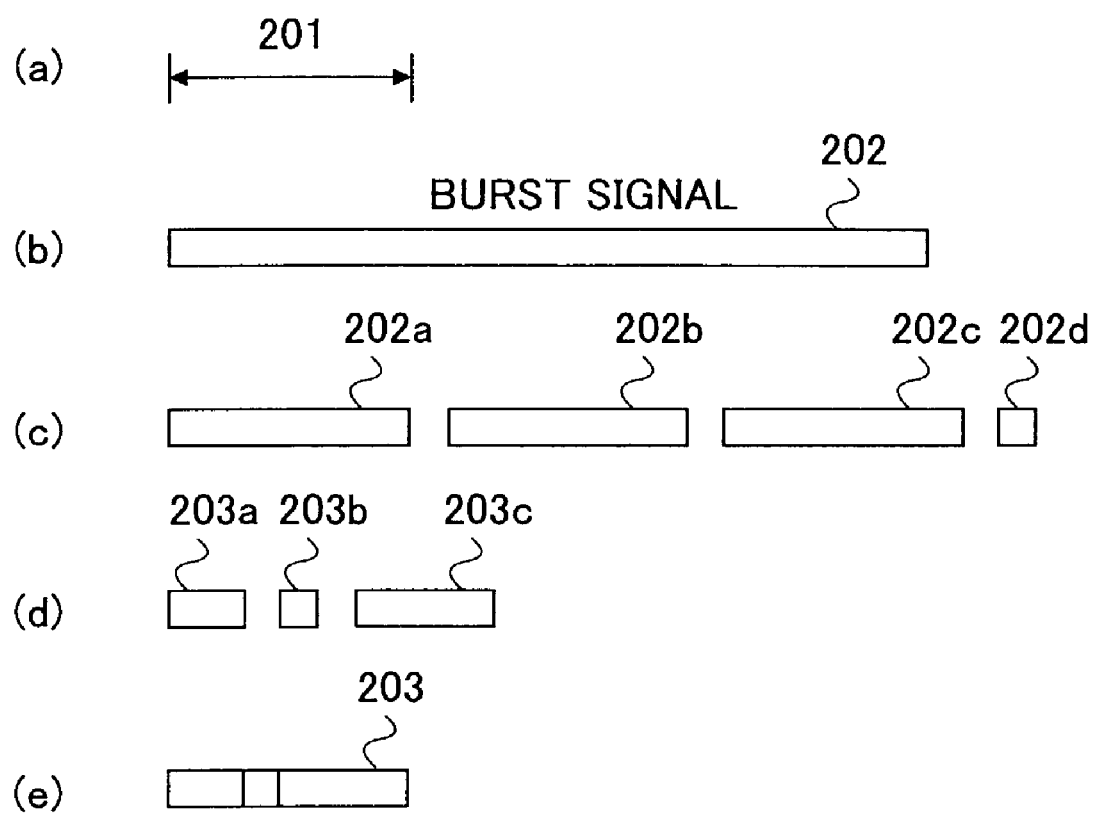
FIG. 2 is a diagram schematically showing a second aspect of the transmission availability control according to the present invention.

FIG. 2 schematically shows the second aspect of transmission availability control according to the present invention. In this aspect, reference lengths for the burst signal transmission (hereinafter referred to as transmission unit lengths) are set on the basis of the transmission path condition. The burst signals to be transmitted are divided or combined to match the transmission unit length, and then transmitted in units of the transmission unit length. According to this aspect, encoding and interleaving processes are simplified by limiting possible values that the transmission unit lengths can take.

FIG. 2(a) shows an example 201 of the transmission unit lengths according to this aspect. The transmission unit length 201 is adaptively set on the basis of the switching frequency between the transmission available and unavailable conditions (i.e. the variation cycle of the transmission path condition between fine and not fine).

If, for example, the burst signal 202 that is longer than the transmission unit length 201 as shown in FIG. 2(b) is to be transmitted, the burst signal 202 is divided into a set of burst signals 202a–202d as shown FIG. 2(c) to match the transmission unit length 201, which are then individually transmitted.

On the other hand, if, for example, a set of burst signals 203*a*–203*c* as shown in FIG. 2(*d*), each burst signal of which is shorter than the transmission unit length 201, is to be transmitted, the burst signals are combined into one burst signal 203 as shown in FIG. 2(*e*) to match the transmission unit length 201, and the burst signal 203 is then transmitted at a time.

In the above second aspect, it is possible to set the transmission unit length as one prefixed value. By predefining one transmission unit length that is estimated to be always shorter than the transmission available period, selecting the transmission unit length to be used can be dispensed with, and the control process is simplified. This case is hereinafter called the third aspect of transmission availability control according to the present invention.

In each of the after-mentioned embodiments of the present invention, one of the above-described first, second, and third aspects is alternatively implemented. This is detailed later.

Figure 3:
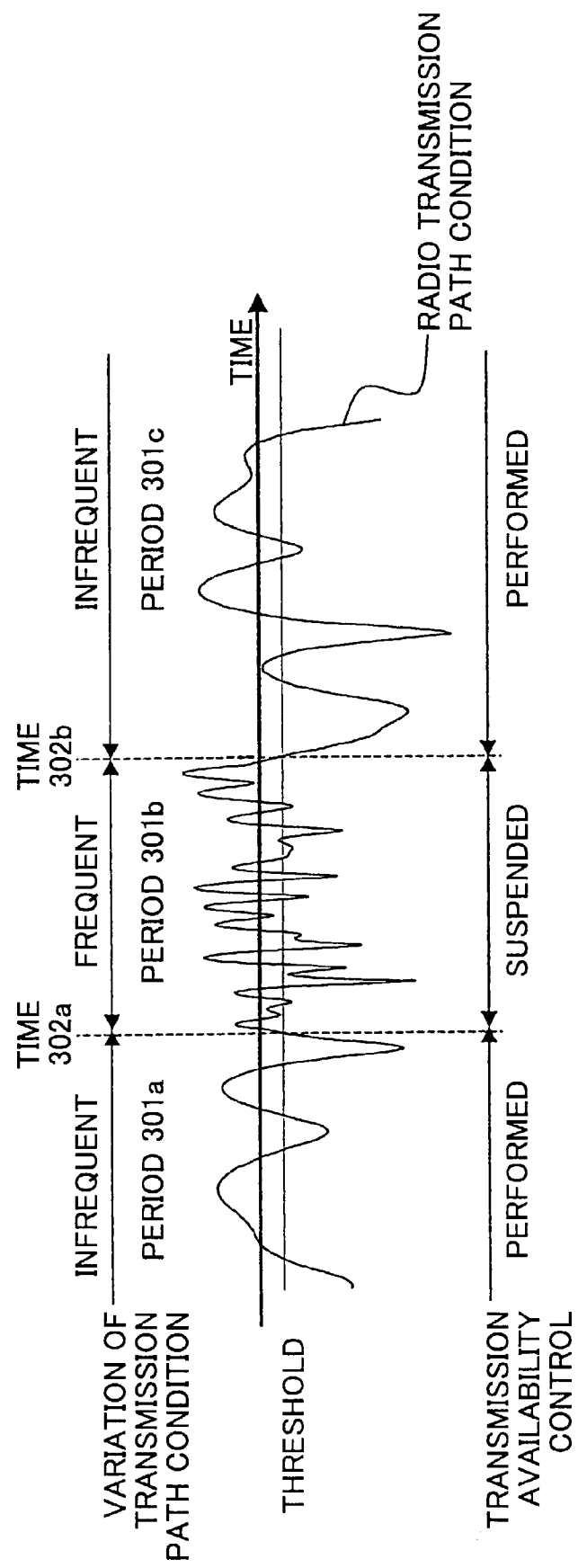
FIG. 3 is a diagram schematically showing a fourth aspect of the transmission availability control according to the present invention.

FIG. 3 schematically shows the fourth aspect of transmission availability control according to the present invention. In this aspect, in the case in which the radio transmission path condition varies very frequently (i.e. the variation cycle is very short), the transmission availability control is suspended in order to simplify the control process because a sufficient effect is not prospective under such condition.

In the example shown, in periods 301*a* and 301*c* where the variation of the radio transmission path condition is not frequent, the transmission availability control is performed, while, in a period 301*b* where the variation is very frequent, the transmission availability control is suspended. While the transmission availability control is suspended, the transmission may be always available (allowed), or may be always unavailable (not allowed).

This control process according to the fourth aspect is utilized along with any one of the first, second, and third aspects in the after-mentioned embodiments of the present invention. Also, in the fourth aspect, the transmission availability control may be suspended when the variation cycle is very long. This is detailed later.

Figure 4:
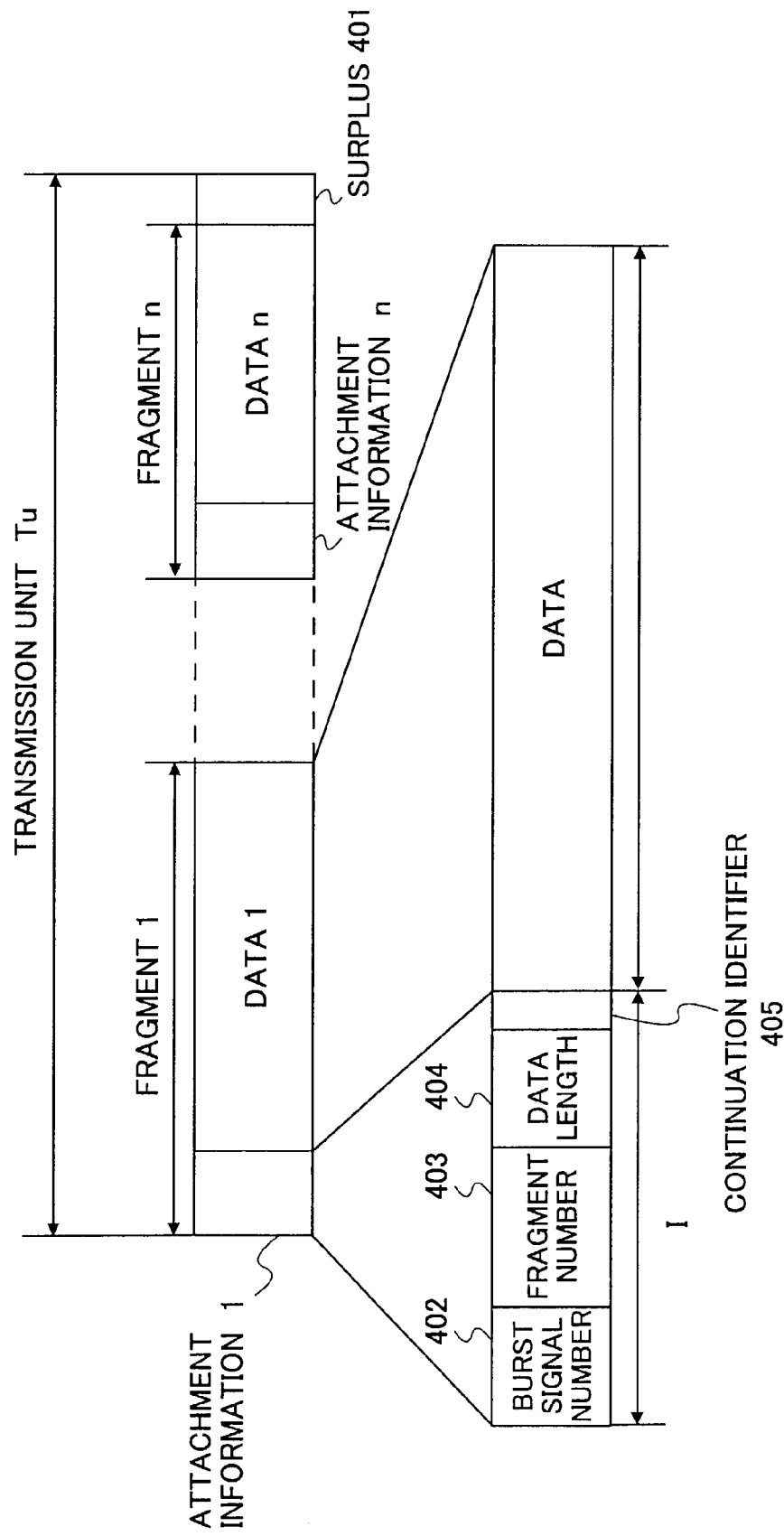
FIG. 4 is a diagram schematically showing a fifth aspect of the transmission availability control according to the present invention.

FIG. 4 schematically shows the fifth aspect of transmission availability control according to the present invention. In this aspect, information to recover the original burst signals is added to each of the burst signals to be transmitted or signals to be transmitted into which the burst signals are divided or combined.

In this aspect, as shown in FIG. 4 as an example, the transmission unit Tu consists of a plurality of fragments (here, fragments 1-n) and a surplus 401, and each fragment consists of attachment information to recover the original burst signals and data.

The attachment information consists of, as shown, a burst signal number 402 to identify the original burst signal, a fragment number 403 indicating the order of those fragments, a data length 404 indicating the length of the data to which the attachment information is added, and a continuation identifier 405 indicating whether another fragment follows.

Alignment of these components of the attachment information is not to be limited to the one shown in FIG. 4. Also, in the case in which either of dividing or combining is performed in the division/combination processes, some of the above components can be dispensed with.

Preferably, this control process of the fifth aspect is implemented in every embodiment described below. It is here assumed in the following description that each embodiment below employs the attachment information of the fifth aspect.

Now specific embodiments achieving the above-described transmission availability control according to the present invention are described below with reference to the above-described aspects and the accompanying figures.

First, the radio transmission system and its burst signal transmitting method according to the first embodiment of the present invention are described with reference to FIGS. 5–9. This embodiment is intended to achieve the transmission availability control of the above-described second aspect.

Figure 5:
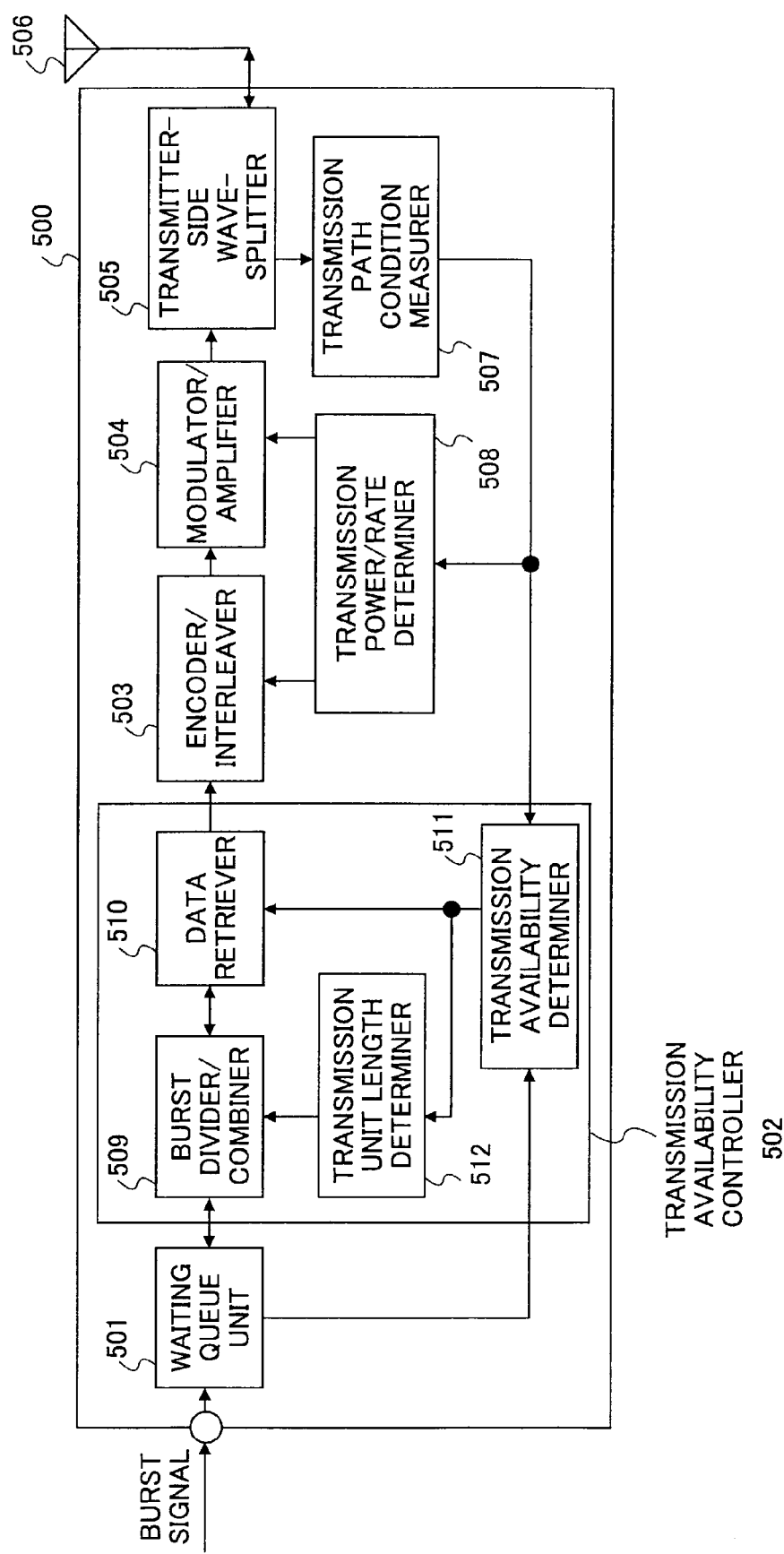
FIG. 5 is a block diagram schematically showing the configuration of a communication terminal serving as a transmitting station in a radio transmission system according to a first embodiment of the present invention.

The transmitting station of this embodiment is now described with reference to FIG. 5. FIG. 5 schematically shows the configuration of the communication terminal 500 serving as the transmitting station in the radio transmission system of this embodiment.

The communication terminal 500 includes a waiting queue unit 501 for accumulating the burst signals to be transmitted, a transmission availability controller 502, an encoder/interleaver 503, a modulator/amplifier 504, a transmitter-side wave-splitter 505, an antenna 506, a transmission path condition measurer 507 for measuring the radio transmission path condition between the transmitting station and the receiving station, and a transmission power/rate determiner 508.

The transmission availability controller 502 includes a burst divider/combiner 509, a data retriever 510, a transmission availability determiner 511 for allowing or banning the burst signal transmission on the basis of the measured radio transmission path condition, and a transmission unit length determiner 512 for determining the transmission unit length as a reference length for burst signal transmission.

Operation of the communication terminal 500 serving as the transmitting station of this embodiment is now described. Input burst signals are sequentially accumulated in the waiting queue unit 501. When the burst divider/combiner 509 outputs a data retrieving request signal to the waiting queue unit 501, the burst signal accumulated in the waiting queue unit 501 is then retrieved and output to the burst divider/combiner 509.

The burst signal, which is input to the burst divider/combiner 509, is divided or combined such that its length will match a predetermined transmission unit length, as described in the above-mentioned first aspect. In this context, the predetermined transmission unit length is indicated from a transmission unit length indication signal that is output from the transmission unit length determiner 512.

When the data retriever 510 outputs the data retrieving request signal to the burst divider/combiner 509, the data retriever 510 retrieves a burst signal generated after dividing or combining, whose length equals to the transmission unit length, and inputs it to the encoder/interleaver 503.

Since the data retriever 510 outputs the request signal to the burst divider/combiner 509 on the basis of the transmission availability control signal that is output from the transmission availability determiner 511, switching between transmission allowed and transmission not allowed of the transmission unit-long burst signal is controlled according to whether the signal is output to the encoder or not. In other words, when the transmission availability control signal from the transmission availability determiner 511 indicates "transmission allowed", the data retriever 510 retrieves the transmission unit-long burst signal from the burst divider/combiner 509 and performs some following transmission processes on it, while, when the transmission availability control signal indicates "transmission not allowed", the data retriever 510 does not retrieve the transmission unit-long burst signal from the burst divider/combiner 509, and does not perform the following transmission processes.

The transmission unit-long burst signal, which is input to the encoder/interleaver 503, is encoded and interleaved according to a transmission rate that is determined by the transmission power/rate determiner 508.

After the encoding and interleaving processes, the transmission unit-long burst signal is output to the modulator/amplifier 504, and is modulated and amplified such that its transmission power (when transmission power control is utilized) and/or its transmission rate (when adaptive modulation is utilized) equals the one determined by the transmission power/rate determiner 508. Alternatively, the transmission power and the transmission rate may be measured and transmitted from receiver-side as described later.

After the modulation and amplification processes, the transmission unit-long burst signal is output to the transmitter-side wave-splitter 505, and radio-transmitted via the antenna 506 to the receiving station.

On the other hand, a radio signal, which is received via the antenna 506 from the receiving station, is split and output to the transmission path condition measurer 507 by the transmitter-side wave-splitter 505, and then the radio transmission path condition between the transmitting station and the receiving station is measured. In this context, the radio transmission path condition may be a state quantity such as, for example, the measured instantaneous value of path loss variation; the transmission error rate; the transmission throughput; the distance between the communication terminal 500 and the receiving station; the power of interference from other stations; the number of other receiving stations that intend to receive signals from the antenna 506 on the communication terminal 500; the amount of information to be transmitted; the average thereof; the desired transmission time; the relative physical relationship between the communication terminal 500 and the receiving station; or a combination thereof.

Radio transmission path condition information, which is output by the transmission path condition measurer 507, is input to the transmission power/rate determiner 508. When the transmission path condition is fine, smaller transmission power and/or larger transmission rate is output respectively to the encoder 503 and/or modulator/amplifier 504, while, when the transmission path condition is not fine, larger transmission power and/or smaller transmission rate is output respectively to the encoder 503 and/or modulator/amplifier 504.

The radio transmission path condition information, which is output by the transmission path condition measurer 507, is also input to the transmission availability determiner 511. On the basis of such input radio transmission path condition information and status information of the burst signals waiting for transmission output by the waiting queue unit 501, the transmission availability determiner 511 determines to or not to allow the burst signal transmission.

The transmission waiting status information may be, for example, the amount of data of the burst signals accumulated in the waiting queue unit 501, or an average or maximal value of passing time up to the present moment since each burst signal is input to the waiting queue unit 501.

The above transmission availability determination may be made, for example, by calculating the time-average condition and the instantaneous condition from the radio transmission path condition information. After the calculation, when the instantaneous condition is better than the time-average condition, it is determined to allow the transmission, while, when the instantaneous condition is worse than the time-average condition, it is determined not to allow the transmission. Also, when it is observed from the transmission waiting status information that the amount of data or the waiting time of the burst signal waiting for the transmission reaches a predetermined threshold, it is determined to allow the transmission regardless of whether the transmission path condition is fine or not.

The above-described example is the case in which the control based on the transmission waiting status information always gets preference in the transmission availability determination. However, the control according to this embodiment is not limited to such a case. For example, the above-described threshold for the amount of data or waiting time may vary on the basis of the radio transmission path condition in order to take account of both of the radio transmission path condition and the transmission waiting status in transmission control.

The above time-average condition may be, for example, the median of receiving power in a short period, and the above instantaneous condition may be, for example, an instantaneous receiving power. Also, the above-described case in which the instantaneous condition is worse than the time-average condition may be the case in which the receiving power is caused to go down, for example, due to fading.

On the basis of the above determination, the transmission availability determiner 511 generates the transmission availability control signal indicating the transmission allowed or the transmission not allowed. This control signal is output to the data retriever 510 and the transmission unit length determiner 512. The transmission availability control signal may be generated and output each time the transmission availability determiner 511 makes a decision or only when the transmission availability changes (i.e. from "allowed" to "not allowed", or from "not allowed" to "allowed").

When the transmission availability control signal is input to the transmission unit length determiner 512, the determiner 512 determines the transmission unit length on the basis of the control signal, and then generates on the basis of the determined transmission unit length the transmission unit length indication signal, which is then output to the burst divider/combiner 509.

In the above transmission unit length determination, the control according to the above-described first aspect is intended to be realized. In a specific example, for example, a predetermined threshold may be predefined to determine whether the radio transmission path condition is fine or not. Then the transmission availability is switched between the transmission allowed and the transmission not allowed in order to transmit the signals only under the circumstances that the condition is fine. A cycle of such switching is observed, and the transmission unit length is varied according to the length of the observed switching cycle such that the ratio of the length of the switching cycle to the transmission unit length (i.e. the switching cycle length/the transmission unit length) is kept constant, in order to set the transmission unit length according to the radio transmission path condition. This is detailed later. The change of the transmission unit length may be made periodically, or when the accumulated number of times of switching reaches a threshold.

Figure 6:
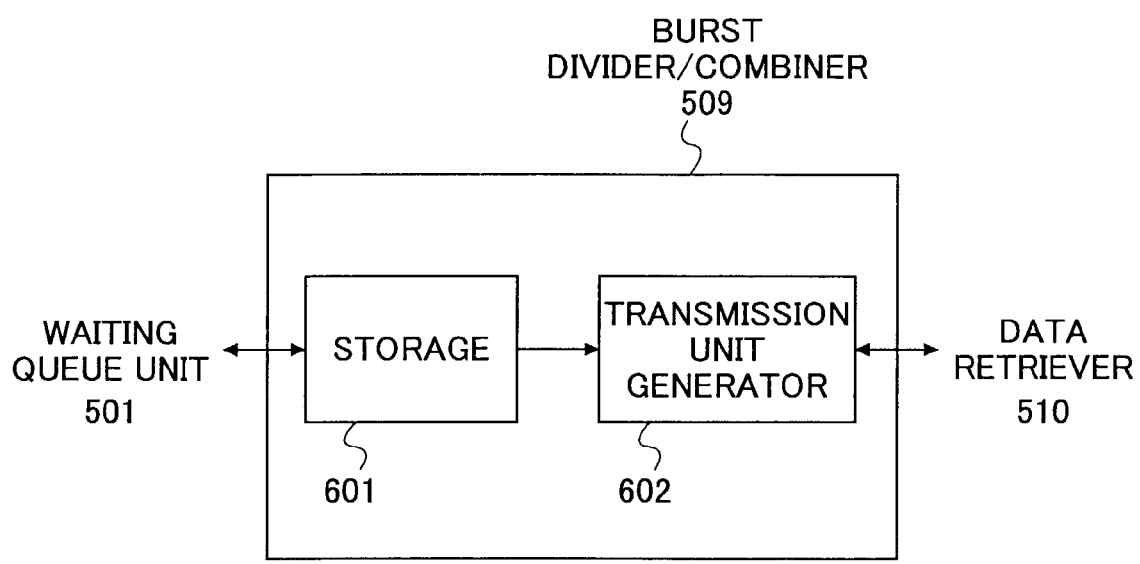
FIG. 6 is a block diagram schematically showing the configuration of a burst divider/combiner according to the first embodiment of the present invention.

The configuration of the burst divider/combiner 509 of this embodiment is now described with reference to FIG. 6. FIG. 6 schematically shows the configuration of the burst divider/combiner 509 of this embodiment.

As shown in FIG. 6, the burst divider/combiner 509 includes a storage 601 having a plurality of data storing areas, and a transmission unit generator 602. A burst signal read out into the burst divider/combiner 509 is temporarily stored in the storage 601, and then output to the transmission unit generator 602 after being divided if necessary.

In the transmission unit generator 602, the attachment information is added to the burst signal and the surplus is filled in to form a signal as shown in FIG. 4, which is then output to the data retriever 510.

Figure 7:
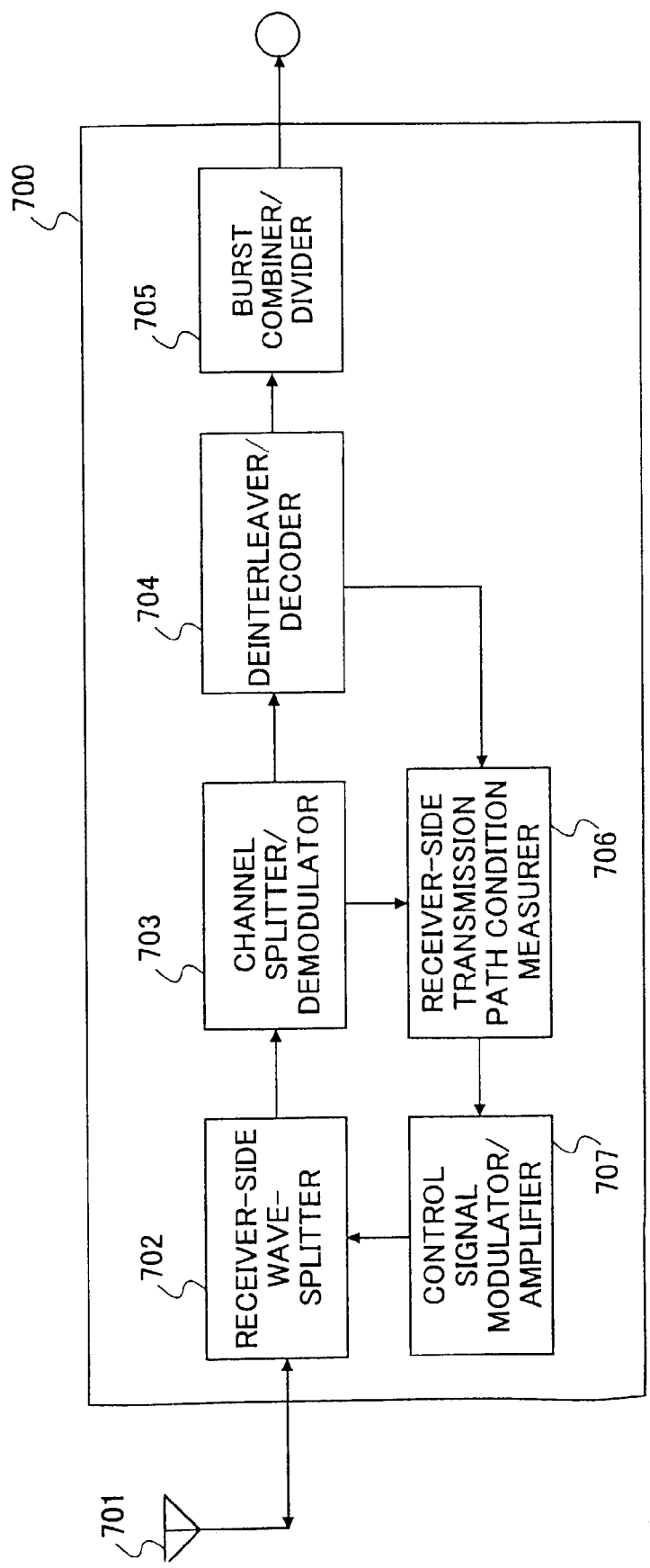
FIG. 7 is a block diagram schematically showing the configuration of a communication terminal serving as a receiving station in the radio transmission system according to the first embodiment of the present invention.

The receiving station according to this embodiment is now described with reference to FIG. 7. FIG. 7 schematically shows the configuration of the communication terminal 700 serving as the receiving station in the radio transmission system of this embodiment.

The communication terminal 700 includes an antenna 701, a receiver-side wave-splitter 702, a channel splitter/demodulator 703, a deinterleaver/decoder 704 for deinterleaving and decoding the received signal, a burst combiner/divider 705, a receiver-side transmission path condition measurer 706, and a control signal modulator/amplifier 707.

The channel splitter/demodulator 703 demodulates the received signal, and outputs information associated with the transmission path condition that can be observed at receiver-side to the receiver-side transmission path condition measurer 706. The above information may be, for example, an instantaneous receiving power output from the channel splitter/demodulator 703; transmission throughput; power of interference from other stations; or transmission error rate output from the decoder 704. The receiver-side transmission path condition measurer 706 outputs such information or averaged or quantized data thereof to the control signal modulator/amplifier 707.

An operation of the communication terminal 700 serving as the receiving station of this embodiment is now described. The receiver-side wave-splitter 702 outputs a radio signal, which is received via the antenna 701, to the channel splitter/demodulator 703.

In the channel splitter/demodulator 703, the data channel received signal is demodulated, and output to the deinterleaver/decoder 704, while the information associated with the radio transmission path condition between the transmitting station and the communication terminal 700 obtained from the received signal is output to the receiver-side transmission path condition measurer 706.

In the deinterleaver/decoder 704, the demodulated signal is deinterleaved and decoded to recover the transmission unit-long burst signal, which is then output to the burst combiner/divider 705. In the burst combiner/divider 705, the decoded signal that is the transmission unit-long burst signal is recovered into the original burst signal on the basis of the information included in the attachment information as shown in FIG. 4.

The receiver-side transmission path condition measurer 706, as described above, does nothing to or averages or quantizes the information associated with the transmission path condition that is output from the channel splitter/demodulator 703, and then outputs it to the control signal modulator/amplifier 707. The control signal modulator/amplifier 707 then modulates the information input, and transmits it via the receiver-side wave-splitter 702 and the antenna 701 to the transmitting station.

Figure 8:
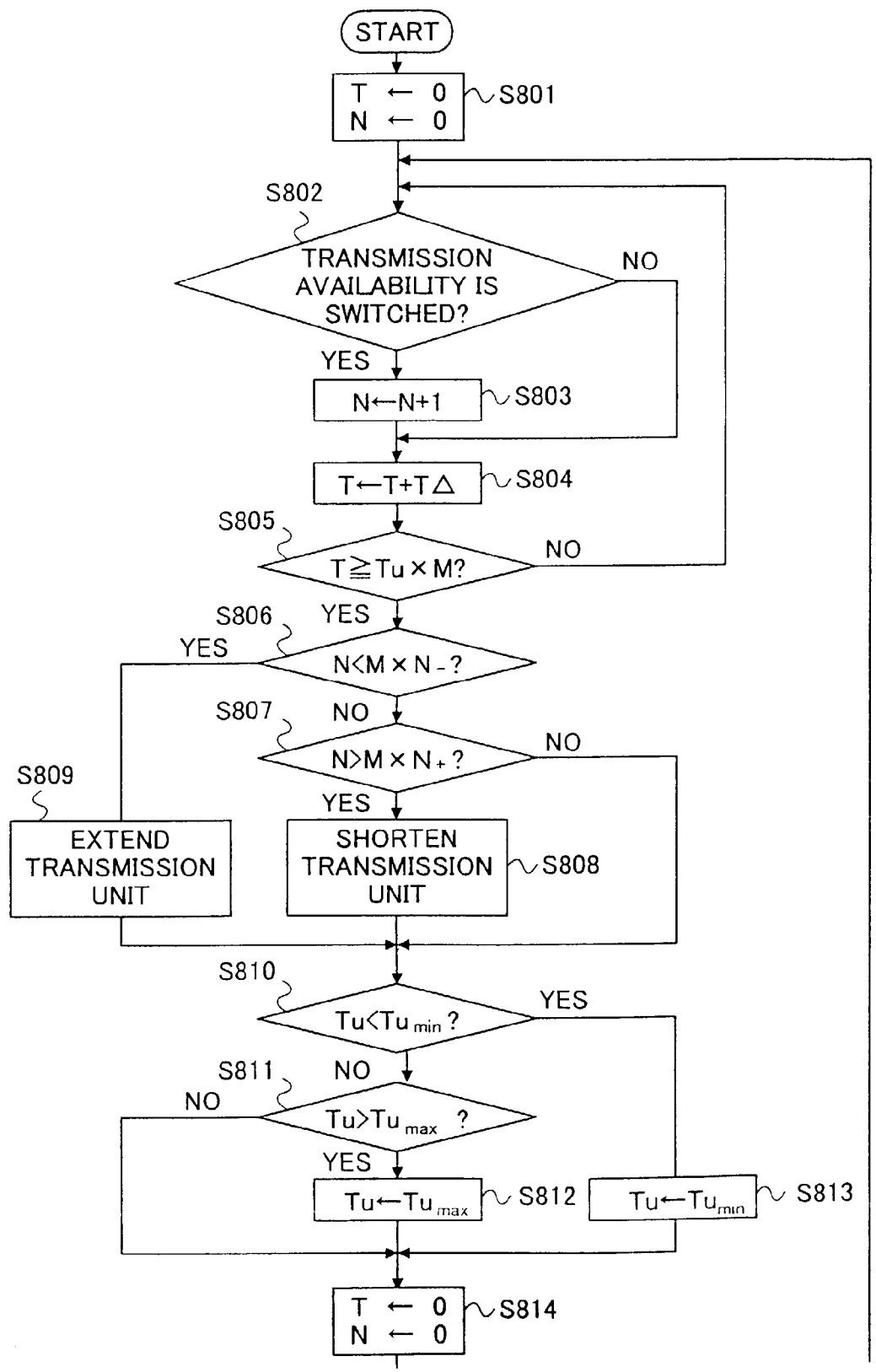
FIG. 8 is a flowchart showing an example of a process in a transmission unit length determiner according to the first embodiment of the present invention.

A transmission unit length determination process according to this embodiment is now described with reference to FIG. 8. FIG. 8 shows an example of the process flow in the transmission unit length determiner 512 of this embodiment.

In the example shown, the transmission unit length is adjusted on the basis of the number of times of switching the transmission availability during a predetermined period that corresponds to a result by multiplying the transmission unit length by a constant.

When the transmission unit length availability control signal is input to the transmission unit length determiner 512 and the transmission unit length determination process starts, 0 is then assigned to variables T and N to initialize (S801), where T represents a counter indicating time, and N represents a counter indicating the number of times of switching between transmission allowed and transmission not allowed in the transmission availability control signal.

The following processes in S802–S814 are repeated in a constant cycle T-delta. First, it is monitored which the transmission availability control signal indicates: transmission allowed or transmission not allowed. Comparing with the indication of the last transmission availability control signal, it is then determined whether the transmission availability is switched (S802). Only when it is switched, N is incremented by 1 (S803).

After the T-delta is added to T (S804), T is compared with a predetermined observation period (Tu*M) (S805), where Tu represents the transmission unit length, and M represents a predetermined constant. If T>=(Tu*M) is not satisfied, it is considered that the predetermined observation period is not passed and the procedure goes back to S802.

If the observation period is passed, the procedure enters into the following transmission unit length adjustment processes in S806–S809. A lower threshold $N_-$ and an upper threshold $N_+$ are employed for the number of times of switching the transmission availability intended to be within a period of the transmission unit length Tu, and M times of each threshold is compared with N. If N is smaller than M times of the lower threshold $N_-$ ($M*N_-$) ("YES" at S806), Tu is then extended (S809), while, if N is larger than M times of the upper threshold $N_+$ ($M*N_+$) ("YES" at S807), Tu is then shortened (S808).

The above extension and shortening processes may be, for example, calculated using addition, subtraction, multiplication or division with an adjuster P (where P is a positive integer). In other words, for example, in the extension process in S809, the adjuster P is added to the transmission unit length Tu or Tu is multiplied by P (Tu←Tu+P, or Tu←Tu*P), while, in the shortening process in S808, the adjuster P is subtracted from the transmission unit length Tu or Tu is divided by P (Tu←Tu−P, or Tu←Tu/P).

After the transmission unit length is thus adjusted, the procedure then enters into the following transmission unit length limitation processes in S810–S813. A lower threshold $Tu_{min}$ and an upper threshold $Tu_{max}$ are employed for the transmission unit length Tu, and each threshold is compared with Tu. If Tu is smaller than the lower threshold $Tu_{min}$ ("YES" at S810), $Tu_{min}$ is then assigned to Tu (S813), while, if Tu is larger than the upper threshold $Tu_{max}$ ("YES" at S811), $Tu_{max}$ is then assigned to Tu (S812).

After the transmission unit length is thus adjusted and limited, a final transmission unit length is determined. The procedure then clears T and N (S814), and goes back to S802 to perform the same determination process for the next observation period.

Figure 9:
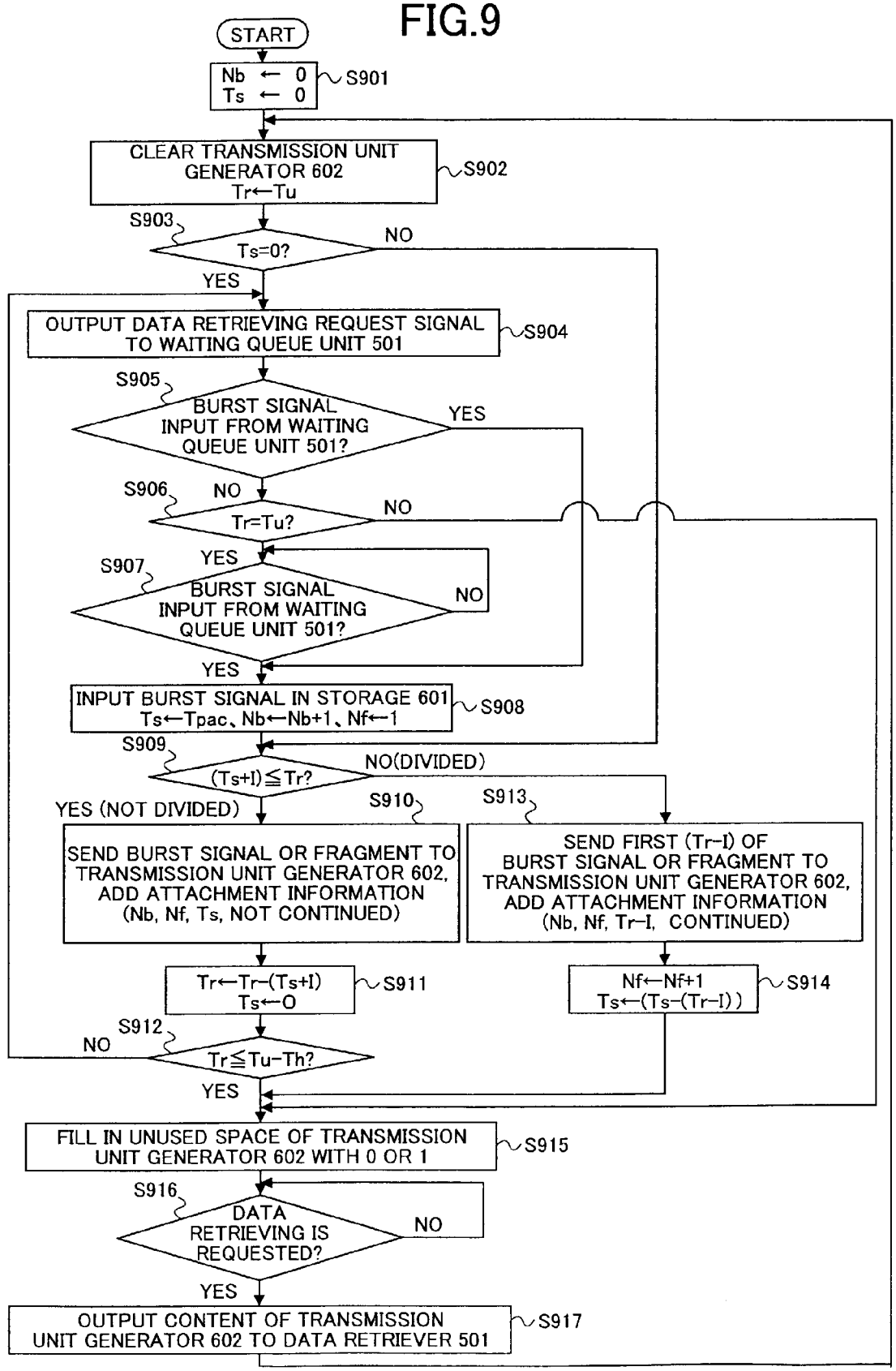
FIG. 9 is a flowchart showing an example of a process in the burst divider/combiner according to the first embodiment of the present invention.

The flow of the burst division/combination processes according to this embodiment is now described with reference to FIG. 9. FIG. 9 shows an example of the process flow in the burst divider/combiner 509 of this embodiment.

When the procedure starts, 0 is assigned to variables Nb and Ts (S901), where Nb represents a serial number assigned to each burst signal, which corresponds to the burst signal number 402 in FIG. 4, and Ts represents the length of an unprocessed part of the burst signal stored in the storage 601.

The data storing area in the transmission unit generator 602 is then cleared, and a value Tu is assigned to a variable Tr (S902), where Tr represents the length of free space of the data storing area in the transmission unit generator 602, and Tu represents the transmission unit length.

Ts is then compared with 0 (S903). If Ts does not equal to 0, the procedure goes to the after-mentioned S909, while, if Ts equals to 0, the burst divider/combiner 509 outputs the data retrieving request signal to the waiting queue unit 501 (S904). If the burst divider/combiner 509 receives the burst signal from the waiting queue unit 501 in response to the request ("Yes" at S905), the procedure goes to the after-mentioned S908.

If the burst signal is not input at S905 ("No" at S905), Tr is compared with Tu (S906). If Tr does not equal to Tu, it is considered that the burst signal or fragment is already stored in the transmission unit generator 602, and the procedure goes to the after-mentioned S915 to enter into the output process in order to avoid causing transmission delay of the stored burst signal or fragment.

If Tr equals to Tu at S906, it is considered that the burst signal or fragment is not yet stored in the transmission unit generator 602, and the procedure waits for the burst signal input from the waiting queue unit 501 (S907).

When the burst signal is input from the waiting queue unit 501, it is temporarily stored in the storage 601, and its length Tpac is assigned to Ts. Also, a new burst signal process starts, the variable Nb is incremented by 1, and 1 is assigned to a variable Nf (S908), where Nf represents a serial number indicating a fragment number, which corresponds to the fragment number 403 in FIG. 4.

In the following processes in S909–S914, the burst signal or fragment stored in the storage 601 is sent to the transmission unit generator 602.

First, a result by adding the length I of the attachment information (c.f. FIG. 4) to the variable Ts is compared with Tr (S909). If (Ts+I)=<Tr is satisfied, it is considered that the total length of the data and the attachment information is fitted in the free space in the transmission unit generator 602, and the burst signal or fragment temporarily stored in the storage 601 is sent to the transmission unit generator 602 without the division process (S910). Then, the attachment information is added to the data, which consists of, as shown in FIG. 4, the burst signal number Nb, the fragment number Nf, the data length Ts, and the continuation identifier. In the case without the division process, the continuation identifier indicates "not continued".

A result by subtracting (Ts+I) from the variable Tr, and 0 are then assigned respectively to Tr and Ts (S911), because a space corresponding to (Ts+I) in the free space of the transmission unit generator 602 is filled.

Tr is then compared with a predetermined threshold (Tu−Th) (S912), where the value Th is the lower length of an effective part used as the data or the attachment information in the transmission unit length Tu. If Tr=<(Tu−Th) is not satisfied, the procedure goes back to S904 to add the burst signal or fragment to the transmission unit. If Tr=< (Tu−Th) is satisfied, the procedure goes to S915 to enter into the transmission process for the present transmission unit.

On the other hand, if (Ts+I)=<Tr is not satisfied at S909, it is considered that total length of the data and the attachment information is not filled in the free space of the transmission unit generator 602, and the burst signal or fragment temporarily stored in the storage 601 is then divided.

That is, the first (Tr−I)-long part from the beginning of the burst signal or fragment stored in the storage 601 is abstracted and sent to the transmission unit generator 602, which adds the attachment information (S913). In this case, the continuation identifier 405 indicates "continued".

The variable Nf is then incremented by 1 and (Tr−I) is subtracted from Ts (S914), because the (Tr−I)-long part of the data stored in the storage 601 is processed as a fragment.

In the following processes in S915–S917, the transmission unit-long burst signal, which is generated in the transmission unit generator 602, is output to the data retriever 510.

First, an unused space (i.e. a surplus) of the data storing area in the transmission unit generator 602 is filled in with "0"s or "1"s (S915). This surplus can be detected by the burst combiner/divider 605 at receiver-side.

The procedure then waits for the data retrieving request signal from the data retriever 510 (S916). When the request signal is input, the transmission unit-long burst signal, which is generated in the transmission unit generator 602, is output to the data retriever 510 (S917).

The procedure for one transmission unit-long burst signal is finished after the process in the burst divider/combiner 509, and the procedure goes back to S902.

Thus, according to this embodiment, before being transmitted, the burst signals are divided/combined to coordinate their lengths with the transmission unit that is set on the basis of the radio transmission path condition between the transmitting station and the receiving station in order to transmit them in units of the transmission unit. Therefore, regardless of the lengths of the burst signals, transmitting the burst signal under the circumstances that the radio transmission path condition is not fine can be avoided.

Also, since the transmission unit length is updated each time the predetermined observation time is passed regardless of the cycle of switching between transmission allowed and transmission not allowed, the transmission unit length is updated at a proper frequency even when the switching cycle is very long.

In this embodiment, if the indication of the transmission unit length, which is output from the transmission unit length determiner 512, is provided to always represent one predetermined value, the control according to the above-described third aspect will be achieved.

Alternatively, the transmission unit length may only take one of a predetermined plurality of values in this embodiment. Thus, the signal length of the transmission unit-long burst signal, which is output from the data retriever 510, can fall within the predetermined values, simplifying the following encoding and interleaving processes. In this case, the shortening and extension processes of the transmission unit length (S808 and S809 in FIG. 8) are achieved by selecting one-size longer or shorter transmission unit length.

Although this embodiment is described as a case in which the fragment number Nf 403 is used as a part of the attachment information, the present invention is not limited to such a case. For example, any other information indicating the location of the fragment such as the number of bits or bytes from the beginning of the original burst signal or the results by dividing them by a predetermined value may be used. Here, the predetermined value may be, for example, a greatest common divider of all possible values of the value (Tu−I) in the transmission unit length Tu. When such fragment location information other than the fragment number is used, the fragment can be further divided/combined at any location in the burst signal to which it belongs. This enables that, for example, even though the transmission unit length Tu is changed when retransmitted by the automated retransmission (ARQ) control, the fragment to be retransmitted can be further divided/combined to match a new transmission unit length Tu.

Figure 10:
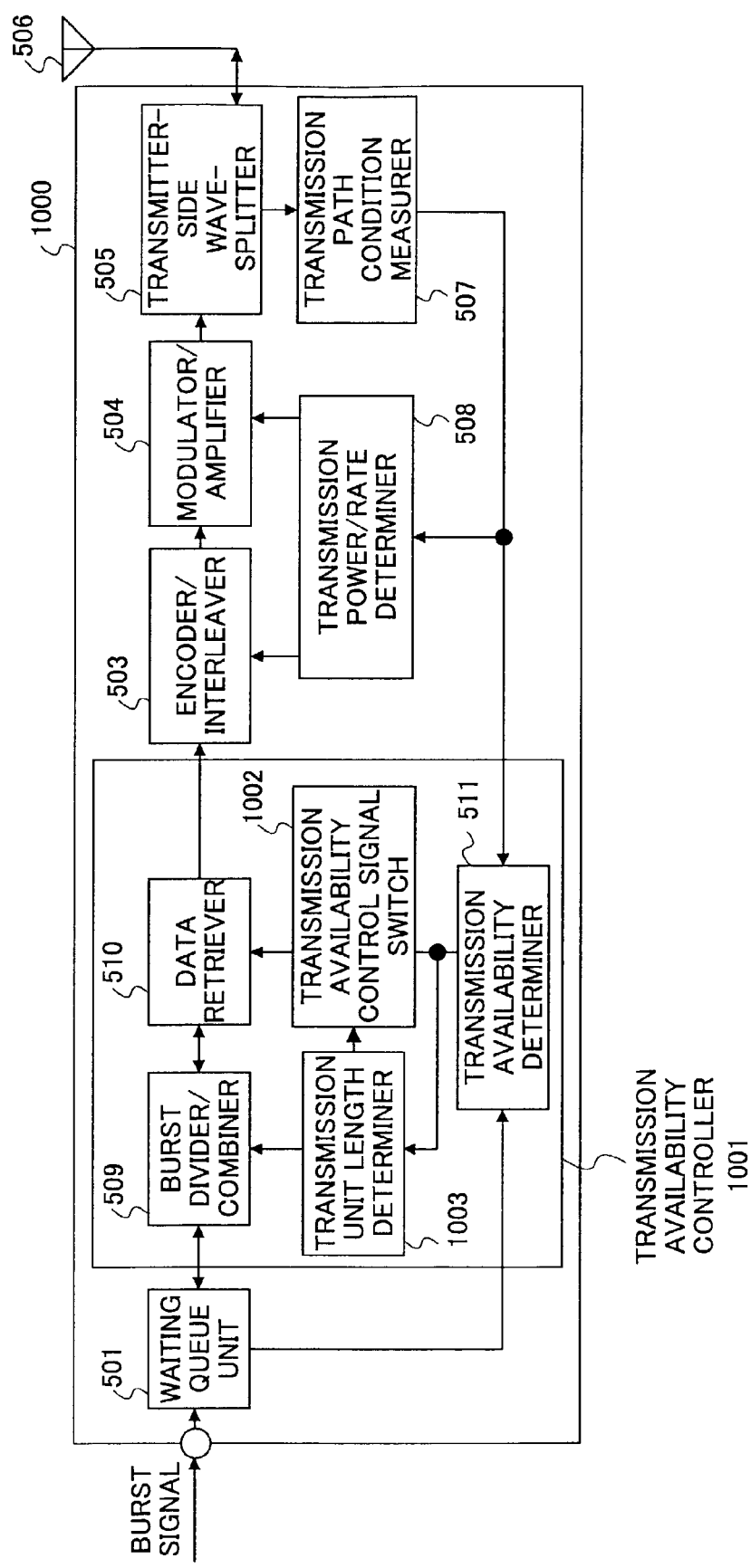
FIG. 10 is a block diagram schematically showing the configuration of a communication terminal serving as a transmitting station in a radio transmission system according to a second embodiment of the present invention.
Figure 11:
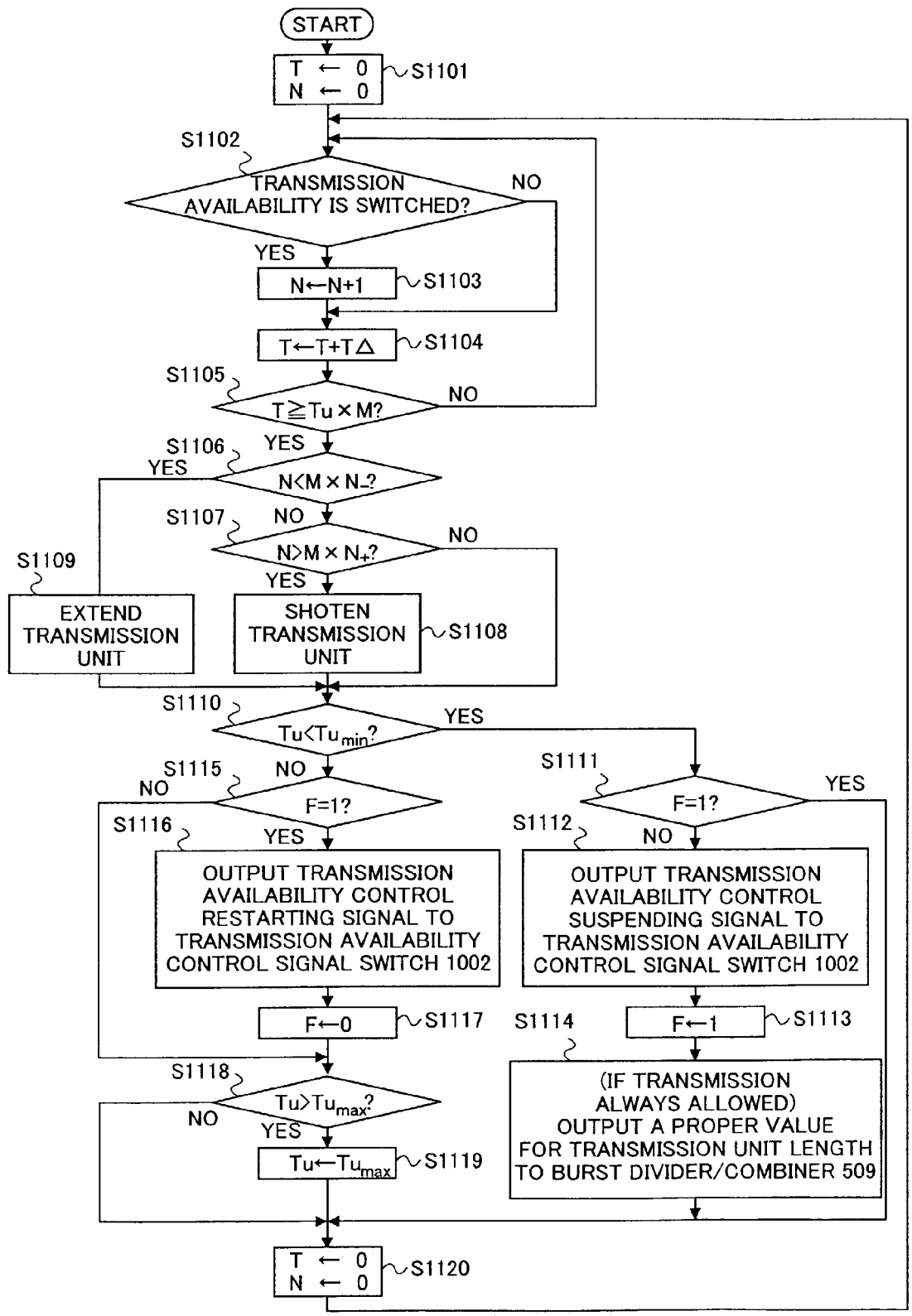
FIG. 11 is a flowchart showing an example of a process in a transmission unit length determiner according to the second embodiment of the present invention.

The radio communication system and its burst signal transmitting method according to the second embodiment of the present invention are now described with reference to FIGS. 10 and 11. This embodiment basically has configuration and operation similar to the ones of the first embodiment, however it is intended to achieve not only the transmission availability control according to the above-described second aspect of the present invention but also the one of the fourth aspect.

First, the configuration of the communication terminal according to this embodiment is described with reference to FIG. 10. FIG. 10 schematically shows the configuration of the communication terminal 1000 serving as the transmitting station included in the radio transmission system according to this embodiment. Components similar to the transmitting station of the first embodiment (i.e. the communication terminal 500 in FIG. 5) have consistent reference numbers, and are not detailed here for convenience. Also, since the communication terminal serving as the receiving station included in the radio communication system according to this embodiment has the same configuration and operation as the ones of the receiving station of the first embodiment (i.e. the communication terminal 700 in FIG. 7), it is not shown or detailed here for convenience.

The communication terminal 1000 of this embodiment has a transmission availability controller 1001 newly having a transmission availability control signal switch 1002. The transmission availability control signal switch 1002 normally outputs the transmission availability control signal, which is output from the transmission availability determiner 511, to the data retriever 510 without any processing.

The transmission unit length determiner 1003 of this embodiment monitors the determined transmission unit length. When the transmission unit length becomes shorter, for example, than a predetermined threshold, it is considered that the cycle of switching between the transmission allowed period and the transmission not allowed period becomes too short (i.e. the switching becomes too frequent), and the transmission unit length determiner 1003 outputs a control signal (hereinafter referred to as a transmission availability control suspending signal) indicating the transmission availability control signal switch 1002 such that the transmission availability control signal is not input to the data retriever 510 in order to suspend the transmission availability control.

When the transmission availability control suspending signal is input, the transmission availability control signal switch 1002 suspends the output of the transmission availability control signal from the transmission availability determiner 511 to the data retriever 510. As described in the fourth aspect, during this suspension, the burst signal may be always allowed for transmission, or all transmission may be suspended. In the case in which the burst signal can be transmitted while the transmission availability control is suspended, the transmission unit may have any length, preferably being sufficiently long.

The transmission unit length determiner 1003 continues monitoring the transmission unit length even during the suspension of the transmission availability control. When the transmission unit length becomes longer, for example, than a predetermined threshold, it is considered that the cycle of switching between the transmission allowed period and the transmission not allowed period becomes not too short (i.e. the switching is not too frequent), and the transmission unit length determiner 1003 outputs a control signal (hereinafter referred to as a transmission availability control restarting signal) indicating to the transmission availability control signal switch 1002 such that the transmission availability control signal is input to the data retriever 510 in order to restart the transmission availability control.

When the transmission availability control restarting signal is input, the transmission availability control signal switch 1002 restarts to output, as usual, the transmission availability control signal from the transmission availability determiner 511 to the data retriever 510.

The transmission unit length determination process of this embodiment is now described with reference to FIG. 11. FIG. 11 shows an example of the process flow in the transmission unit length determiner 1003 of this embodiment. Processes of S1101–S1109 in FIG. 11 are the same as the ones of the first embodiment (S801–S809 in FIG. 8), and are not detailed here for convenience.

Upon being adjusted by the processes until S1109, the transmission unit length is entered into the following transmission unit length limitation processes in S1110–S1119. First, the transmission unit length Tu is compared with the lower threshold $Tu_{min}$ (S1110). If Tu is smaller than $Tu_{min}$, it is determined whether a flag F equals 1 (S1111), where F represents which the last transmission availability control indicates: the control suspended or the control restarted, wherein F equals to 1 when the transmission availability control is suspended.

If F equals to 1 at S1111, the procedure finishes the transmission unit length limitation process and goes to S1120. If F does not equal to 1, it is considered that the transmission availability control is active, and the transmission availability control suspension signal is output to the transmission availability control signal switch 1002 (S1112), while 1 is assigned to the flag F (S1113). In the case in which the transmission is always allowed during the suspension of the transmission availability control, a predetermined arbitrary length is output to the burst divider/combiner 509.

On the other hand, if Tu is not smaller than $Tu_{min}$ at S1110, it is determined whether the flag F equals to 1 (S1115). If F does not equal to 1, the transmission availability control remains active, and the procedure goes to the following (S1118-) transmission unit length processing. If F equals to 1, it is considered that the transmission availability control is being suspended, and the transmission availability control restart signal is output to the transmission availability control signal switch 1002 (S1116), while 0 is assigned to the flag F (S1117).

While the transmission availability control is thus active, the transmission unit length Tu is then compared with the upper threshold $Tu_{max}$ (S1118). If Tu is larger than the upper threshold $TU_{max}$, $Tu_{max}$ is assigned to Tu (S1119)

Thus, after the transmission availability control suspension/restart processes, and the length adjustment and limitation processes, the final transmission unit length is determined. This procedure clears T and N (S1120), and goes back to S1102 to perform the same determination process for the next observation period.

As described above, according to this embodiment, under the circumstances that the determination of the radio transmission path condition is too frequently switched between better and worse (i.e. the variation cycle is very short), making processing too much and too complicated in order to follow such fast variation can be avoided, and the processes can be simplified.

Although this embodiment is described as the one in which the transmission availability control is suspended under the circumstances that the variation cycle is very short, the transmission availability control can be additionally or alternatively suspended under the circumstances that the variation cycle is very long, using configuration and processes similar to the above-described ones.

In other words, when the variation cycle of the transmission path condition is very long, the transmission unavailable period becomes long, and thereby the transmission waiting time of the burst signals to be transmitted, which are accumulated during such period, also becomes long. Therefore, by suspending the transmission availability control, such transmission delays of the burst signals can be reduced.

In this embodiment, if the transmission unit length, which is output from the transmission unit length determiner 512, is fixed, the control according to the above-described third aspect will be achieved as well.

Further, in the case in which the burst signal may be transmitted while the transmission availability control is suspended, a channel error control code length and an interleaving code length can be made longer by setting the transmission unit length relatively long. This can reduce the transmission path error rate, compared to the casein which the transmission unit length is relatively short.

Figure 12:
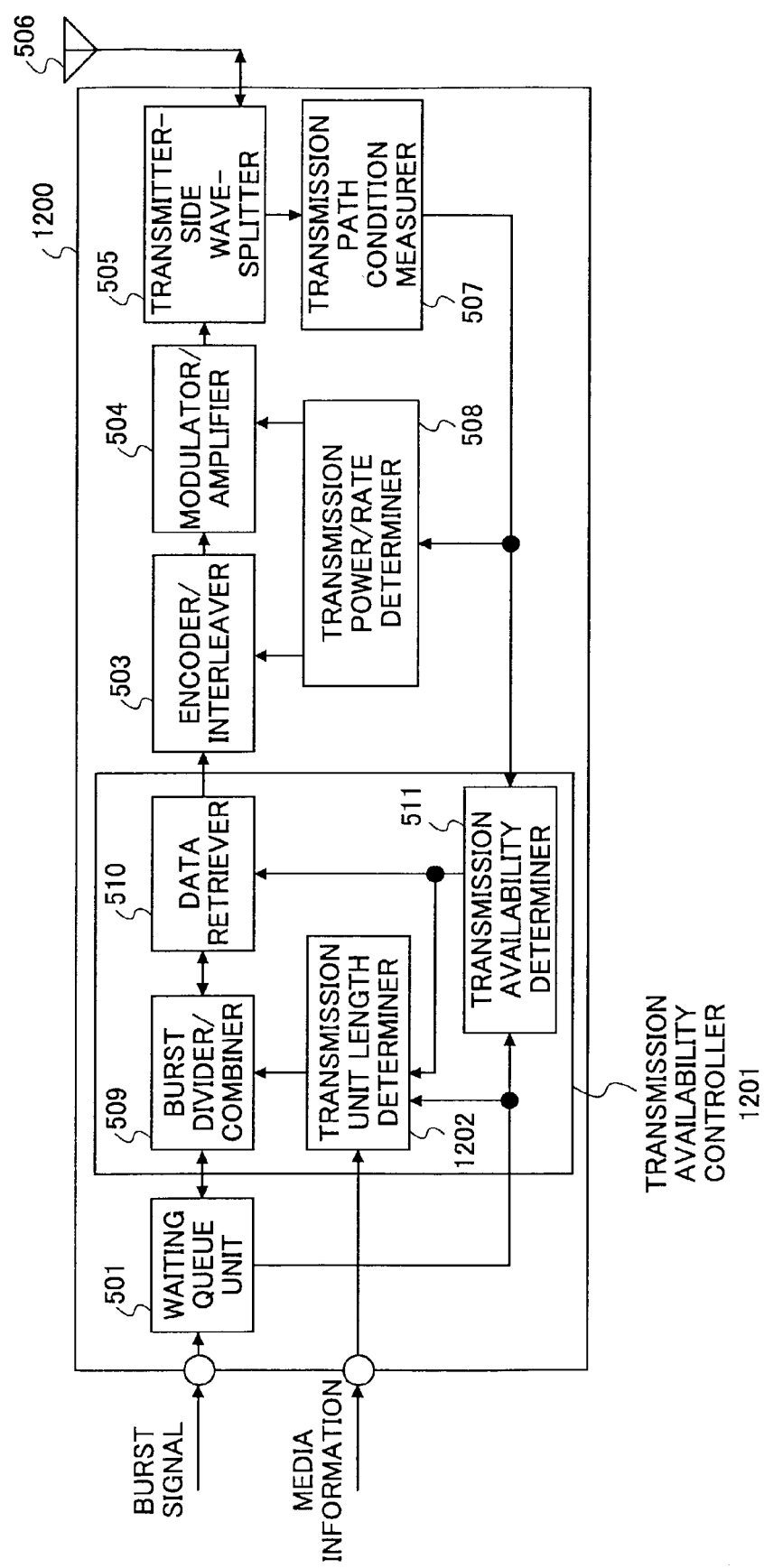
FIG. 12 is a block diagram schematically showing the configuration of a communication terminal serving as a transmitting station in a radio transmission system according to a third embodiment of the present invention.

The radio communication system and its burst signal transmitting method according to the third embodiment of the present invention are now described with reference to FIGS. 12 and 13. This embodiment basically has configuration and operation similar to the ones of the first or second embodiment, however it is intended to determine the transmission unit length additionally on the basis of the transmission waiting status information and/or media information of the burst signals. As an example, the communication terminal and its operation of this embodiment are herein described in the case in which it is implemented based on the communication terminal 500 (FIG. 5) of the first embodiment.

First, the configuration of the communication terminal according to this embodiment is described with reference to FIG. 12. FIG. 10 schematically shows the configuration of the communication terminal 1200 serving as the transmitting station included in the radio transmission system according to this embodiment. Components similar to the transmitting station of the first embodiment (i.e. the communication terminal 500 in FIG. 5) have consistent reference numbers, and are not detailed here for convenience. Also, since the communication terminal serving as the receiving station included in the radio communication system according to this embodiment has the same configuration and operation as the ones of the receiving station of the first embodiment (i.e. the communication terminal 700 in FIG. 7), it is not shown or detailed here for convenience.

In this embodiment, in addition to the transmission availability control signal output from the transmission availability determiner 511, the transmission waiting status information output from the waiting queue unit 501 and the media information associated with the burst signal to be transmitted are input to the transmission unit length determiner 1202.

In this context, the media information may be, for example, information related to the amount of information to be transmitted, information related to the priority of transmission for each burst signal provided from the upper layer, or information related to acceptable delay time for each burst signal.

The transmission unit length determiner 1202 sets the shorter transmission unit length when more immediate transmission is required, for example, when the amount of data waiting for transmission is large, or when the transmission waiting time is long, or when the acceptable delay time is short. The transmission unit length determiner 1202 can thus transmit the transmission unit-long burst signal during a shorter transmission available period, in order to increase the frequency of transmission and transmit immediately the burst signal.

The transmission unit length determination process of this embodiment is now described with reference to FIG. 13. FIG. 13 shows an example of the process flow in the transmission unit length determiner 1202 of this embodiment. Processes other than that of S1306 in FIG. 13 (i.e. S1301–S1305 and S1307–S1315) are the same as the ones of the first embodiment (S801–S814 in FIG. 8), and are not detailed here for convenience.

When it is determined that the predetermined observation time is passed in S1305, the value of N is corrected on the basis of the transmission waiting status information output from the waiting queue unit 501 and the media information associated with the burst signal to be transmitted. In this correction, N may be, for example, increased when the required delay time of the burst signal is small or when the waiting time in the waiting queue unit 501 is long, and decreased in other cases.

After this correction of N, as well as the first embodiment, the transmission unit length adjustment processes (S1307–S1310) and the transmission unit length limitation processes (S1311–S1314) are performed.

As described above, according to this embodiment, the transmission unit length is determined on the basis of, not only how long the cycle of switching between the transmission allowed and the transmission not allowed is, but also of the transmission waiting status and the media information provided from the upper layer of the burst signal to be transmitted. Thus, the burst signal can be transmitted using the effect of increasing and decreasing of the amount of burst signals that can be transmitted, for example, when the burst signal waiting for transmission increases, or when the acceptable delay time is changed.

In this embodiment, the transmission unit length may be changed, for example, periodically, or each time that a particular event occurs (e.g. the waiting time of the burst signal in the waiting queue unit 501 becomes longer than a predetermined threshold).

Also, although, in this embodiment, as an example, the communication terminal and its operation of this embodiment is described in the case in which it is implemented based on the communication terminal 500 (FIG. 5) of the first embodiment, the communication terminal and its operation of this embodiment can be implemented based on the communication terminal 1000 (FIG. 10) of the second embodiment.

The radio communication system and its burst signal transmitting method according to the fourth embodiment of the present invention are now described with reference to FIGS. 14 and 15. This embodiment basically has configuration and operation similar to the ones of the first or second embodiment, however it is intended not to be encoded and interleaved in units of the transmission unit-long signal but in units of the burst signal. As an example, the communication terminal and its operation in this embodiment are herein described in the case in which it is implemented based on the communication terminal 500 (FIG. 5) of the first embodiment.

Figure 14:
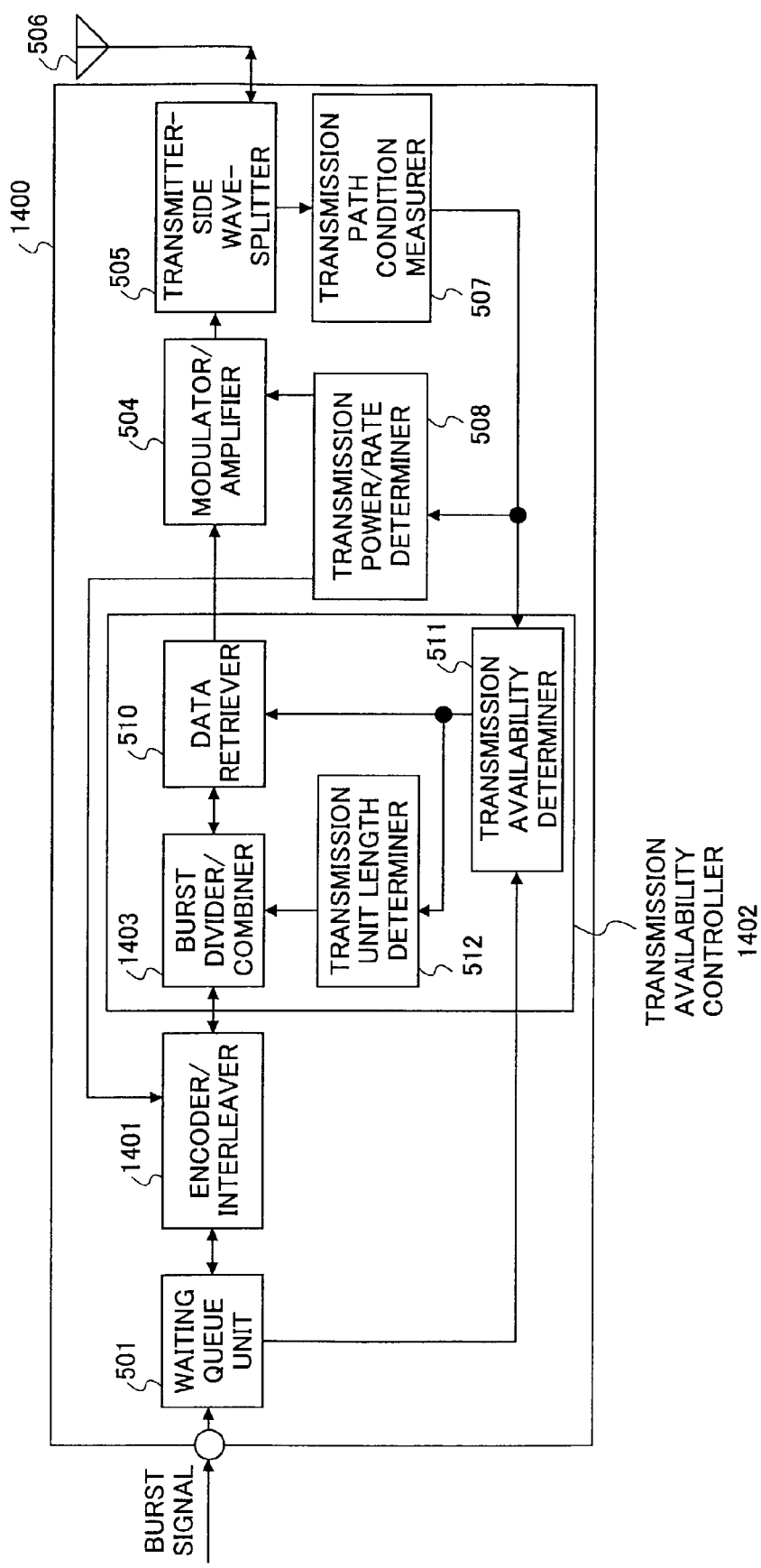
FIG. 14 is a block diagram schematically showing the configuration of a communication terminal serving as a transmitting station in a radio transmission system according to a fourth embodiment of the present invention.
Figure 15:
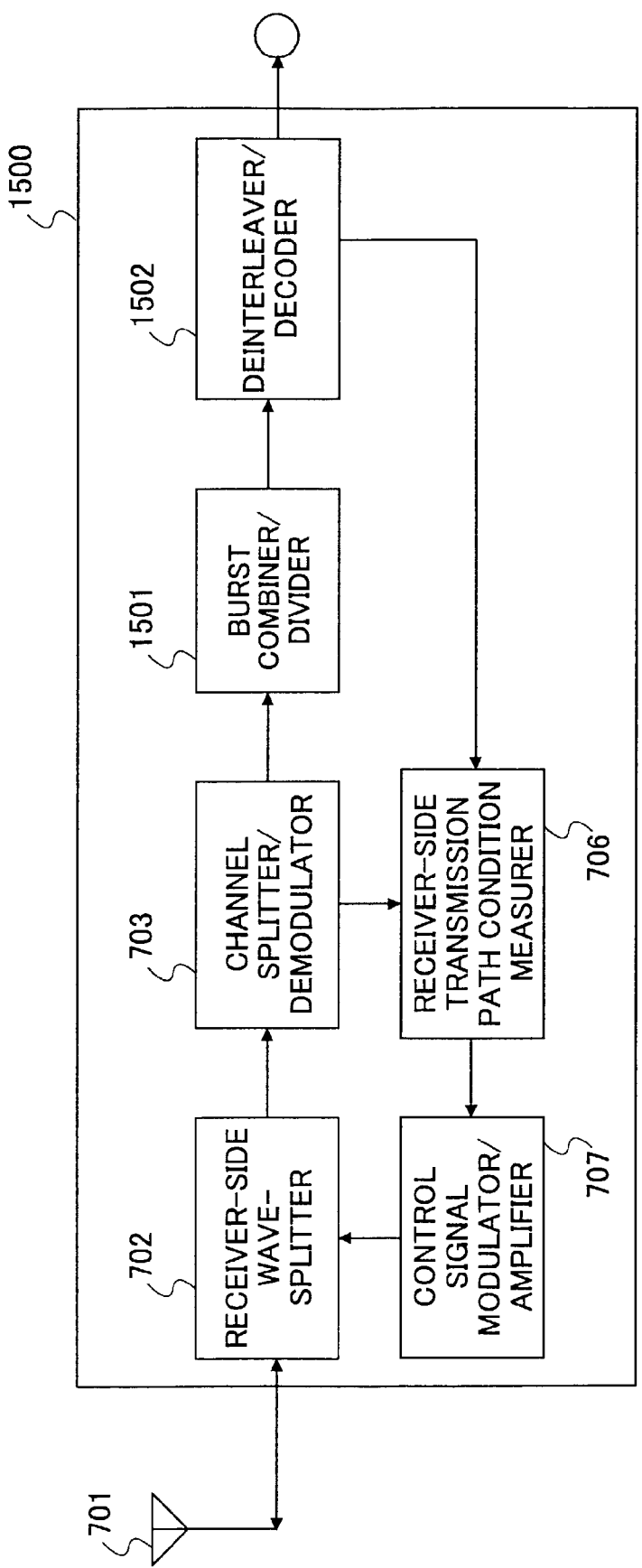
FIG. 15 is a block diagram schematically showing the configuration of a communication terminal serving as a receiving station in the radio transmission system according to the fourth embodiment of the present invention.

FIG. 14 schematically shows the configuration of the communication terminal 1400 serving as the transmitting station included in the radio transmission system according to this embodiment, while FIG. 15 schematically shows the configuration of the communication terminal 1500 serving as the receiving station included in the radio transmission system according to this embodiment. Components similar to the ones of the transmitting station and the receiving station of the first embodiment (i.e. the communication terminal 500 in FIG. 5 and the communication terminal 700 in FIG. 7) have consistent reference numbers, and are not detailed here for convenience.

In the communication terminal 1400, an encoder/interleaver 1401, which is provided between the transmission availability controller 1402 and the waiting queue unit 501, forwards the data retrieving request signal for the waiting queue unit 501, which is output from the burst divider/combiner 1403, to the waiting queue unit 501 without processing, and also encodes and interleaves the burst signal retrieved from the waiting queue unit 501 in units of the burst signal.

Concurrently, in the communication terminal 1500 serving as the receiving station, a burst combiner/divider 1501 is provided subsequently to the channel splitter/demodulator 703, and a deinterleaver/decoder 1502 is provided subsequently to the burst combiner/divider 1501. The channel splitter/demodulator 703 demodulates the transmission unit-long burst signal. Then the burst combiner/divider 1501 recovers the original burst signal and the deinterleaver/decoder 1502 deinterleaves and decodes in units of the burst signal.

As described above, according to this embodiment, rather than encoding/decoding and interleaving/deinterleaving the burst signals in units of the transmission unit, the burst signal is encoded/decoded and interleaved/deinterleaved, before being divided and/or combined, in units of the original burst signal. Therefore, even when the transmission unit length is short, and thereby the code length and the interleave length become short, the effect of lowered error rate being reduced can be avoided.

Also, although, in this embodiment, as an example, the communication terminal and its operation of this embodiment are described in the case in which it is implemented based on the communication terminal 500 (FIG. 5) of the first embodiment, the communication terminal and its operation of this embodiment can be implemented based on the communication terminal 1000 (FIG. 10) of the second embodiment.

Figure 16:
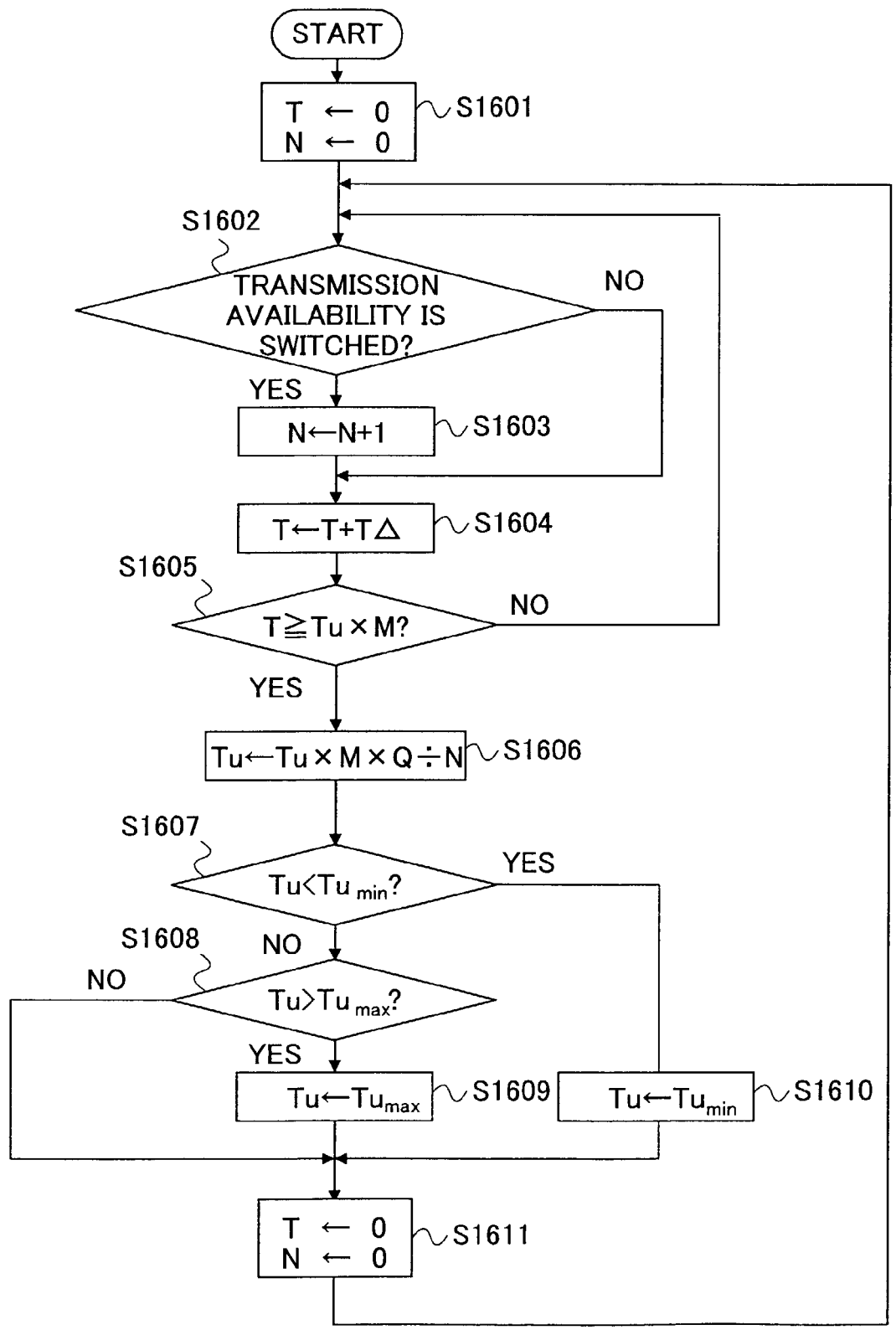
FIG. 16 is a flowchart showing an example of a process in a transmission unit length determiner according to a fifth embodiment of the present invention.

The radio communication system and its burst signal transmitting method according to the fifth embodiment of the present invention are now described with reference to FIG. 16. This embodiment basically has configuration and operation similar to the ones of the first, second, third, or fourth embodiment, however it is intended to adjust the transmission unit length by means of a predetermined function regardless of how long the transmission unit length is.

Since the transmitting station and the receiving station of this embodiment have the same configuration as the ones of the first, second, third, or fourth embodiment, they are not shown or described. The communication terminal and its operation of this embodiment are in an example below described in the case in which they are implemented based on the communication terminals 500 (FIG. 5) and 700 (FIG. 7) of the first embodiment.

The transmission unit length determination process of this embodiment is now described with reference to FIG. 16. FIG. 16 shows an example of the process flow in the transmission unit length determiner of this embodiment.

Figure 13:
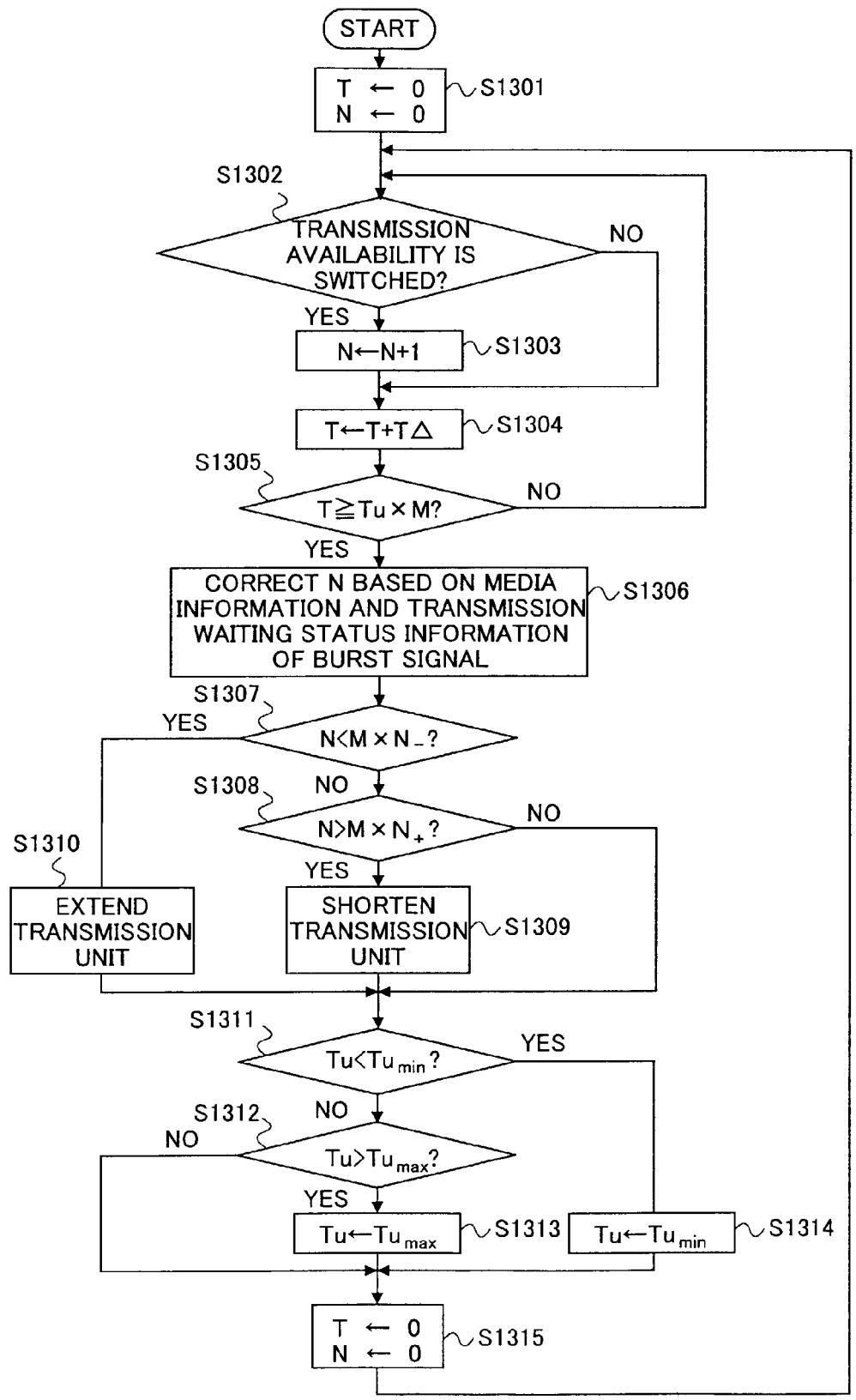
FIG. 13 is a flowchart showing an example of a process in a transmission unit length determiner according to the third embodiment of the present invention.

In FIG. 13, processes other than that of S1606 are the same as the ones of the first embodiment (S801–S809 and S814 in FIG. 8), and are not detailed here for convenience. In this embodiment, in the transmission unit length adjustment process of S1606 (corresponding to S806–S809 in FIG. 8), the transmission unit length is adjusted to an appropriate value estimated by means of a predefined function regardless of how long the transmission unit length is.

In S1606, Q represents the number of times of switching between transmission allowed and transmission not allowed intended to be within the period of the transmission unit length Tu, and a result by multiplying the observation time (Tu*M) by (Q/N) is assigned to Tu for adjustment.

As described above, according to this embodiment, the transmission unit length is determined on the basis of an arbitrary value rather than of the previous transmission unit length. Therefore, it can immediately increase or decrease the transmission length in order to avoid occurring longer delay even when the variation cycle of the transmission path condition rapidly varies.

Alternatively, in the process in S1606, it is possible to pre-hold a look-up table representing a predetermined relationship between an old Tu and a new Tu and to obtain the new Tu by making reference to the table rather than the above calculation, in order to simplify the processing.

Also, in this embodiment, if the transmission unit length Tu is limited to a few predetermined values, the new Tu may be cut up or cut down in S1606.

The radio communication system and its burst signal transmitting method according to the sixth embodiment of the present invention are now described with reference to FIG. 17. This embodiment basically has configuration and operation similar to the ones of the first, second, third, or fourth embodiment, however it is intended to adjust the transmission unit length on the basis of time required for reaching a predetermined number of times of switching between transmission allowed and transmission not allowed, rather than of the observation time.

Since the transmitting station and the receiving station of this embodiment have the same configuration as the ones of the first, second, third, or fourth embodiment, they are not shown or described. The communication terminal and its operation of this embodiment are in an example below described in the case in which they are implemented based on the communication terminals 500 (FIG. 5) and 700 (FIG. 7) of the first embodiment.

The transmission unit length determination process of this embodiment is now described with reference to FIG. 17. FIG. 17 shows an example of the process flow in the transmission unit length determiner of this embodiment.

Figure 17:
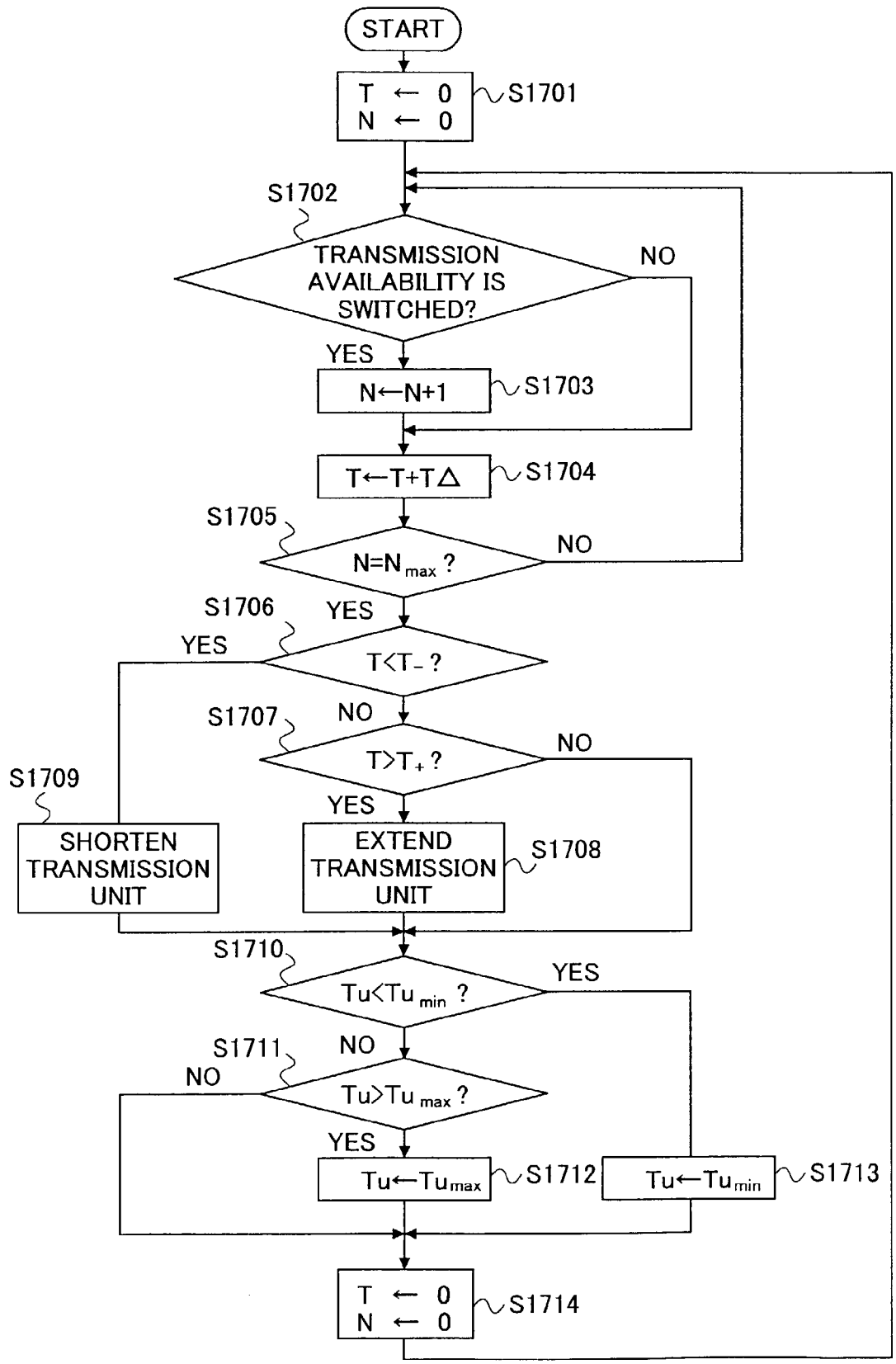
FIG. 17 is a flowchart showing an example of a process in a transmission unit length determiner according to a sixth embodiment of the present invention.

In FIG. 17, processes in S1701–S1704 and S1710–S1714 are the same as the ones of the first, second, third, or fourth embodiment, and are not detailed here for convenience.

After switching between transmission allowed and transmission not allowed, it is determined whether N reaches a predetermined $N_{max}$ (S1705).

If N reaches $N_{max}$, T is then compared with a predetermined lower threshold $T_-$ and a predetermined upper threshold $T_+$. If T is smaller than $T_-$ ("YES" at S1706), the transmission unit length is shortened, while, if T is larger than $T_+$ ("YES" at S1707), the transmission unit length is extended.

The above increase/decrease process may be implemented by an arbitrary method, such as by adding, subtracting, multiplying, or dividing by a predetermined value, or by a predetermined function of T and N.

As described above, according to this embodiment, when the number of times of switching between transmission allowed and transmission not allowed reaches the predetermined value (e.g. $N_{max}$ in this example), the transmission unit length is adjusted. Therefore, even when the cycle of switching is long, and thereby the observed number of times of switching N is low, degrading the accuracy of updating the transmission unit length Tu can be avoided.

Although, in this embodiment, as an example, the communication terminal and its operation of this embodiment are described in the case in which it is implemented based on the communication terminal 500 (FIG. 5) of the first embodiment, the communication terminal and its operation of this embodiment can be implemented based on the communication terminal of the second, third, or fourth embodiment.

Figure 19:
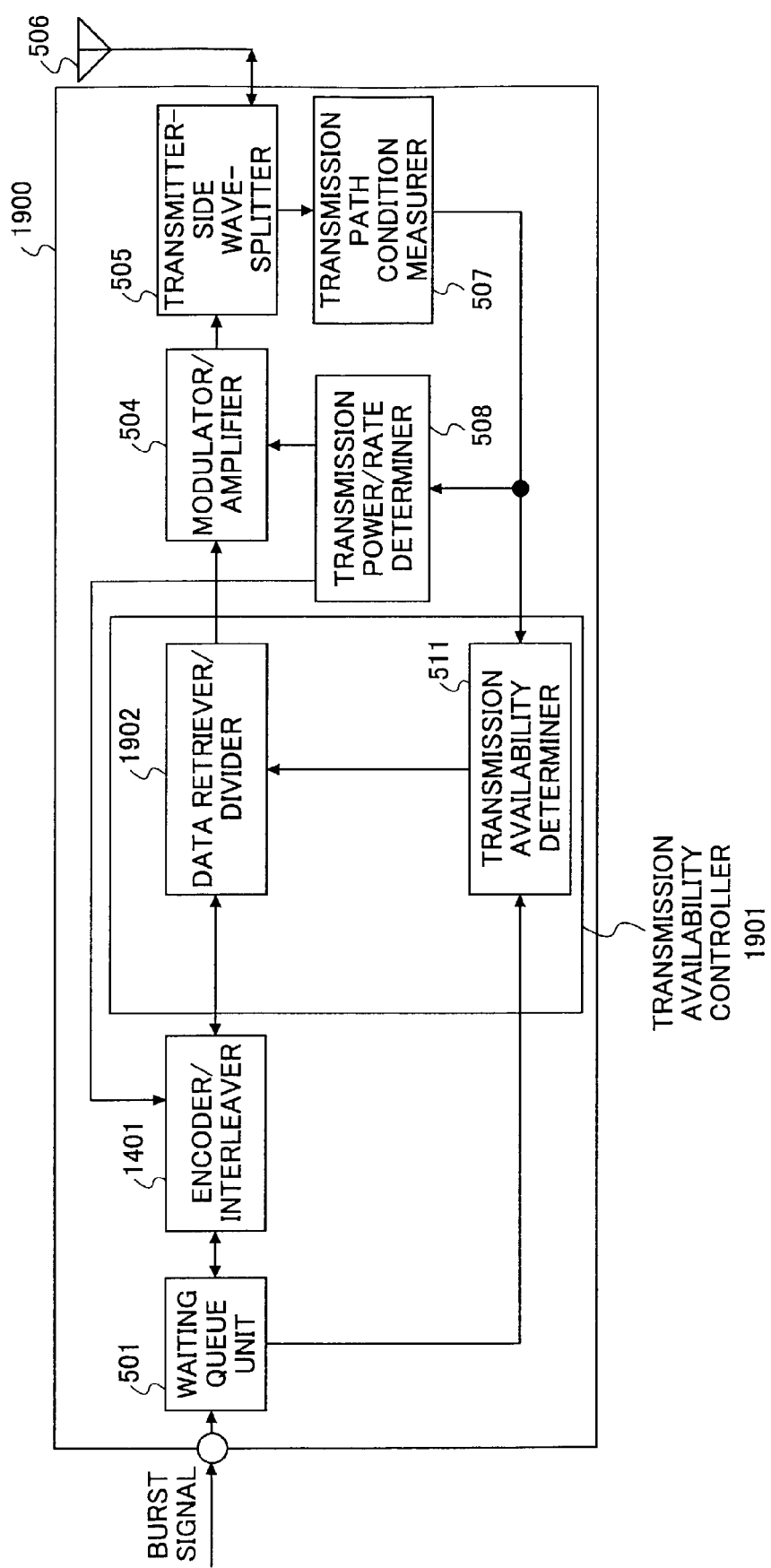
FIG. 19 is a block diagram schematically showing the configuration of a communication terminal serving as a transmitting station in a radio transmission system according to the seventh embodiment of the present invention.
Figure 20:
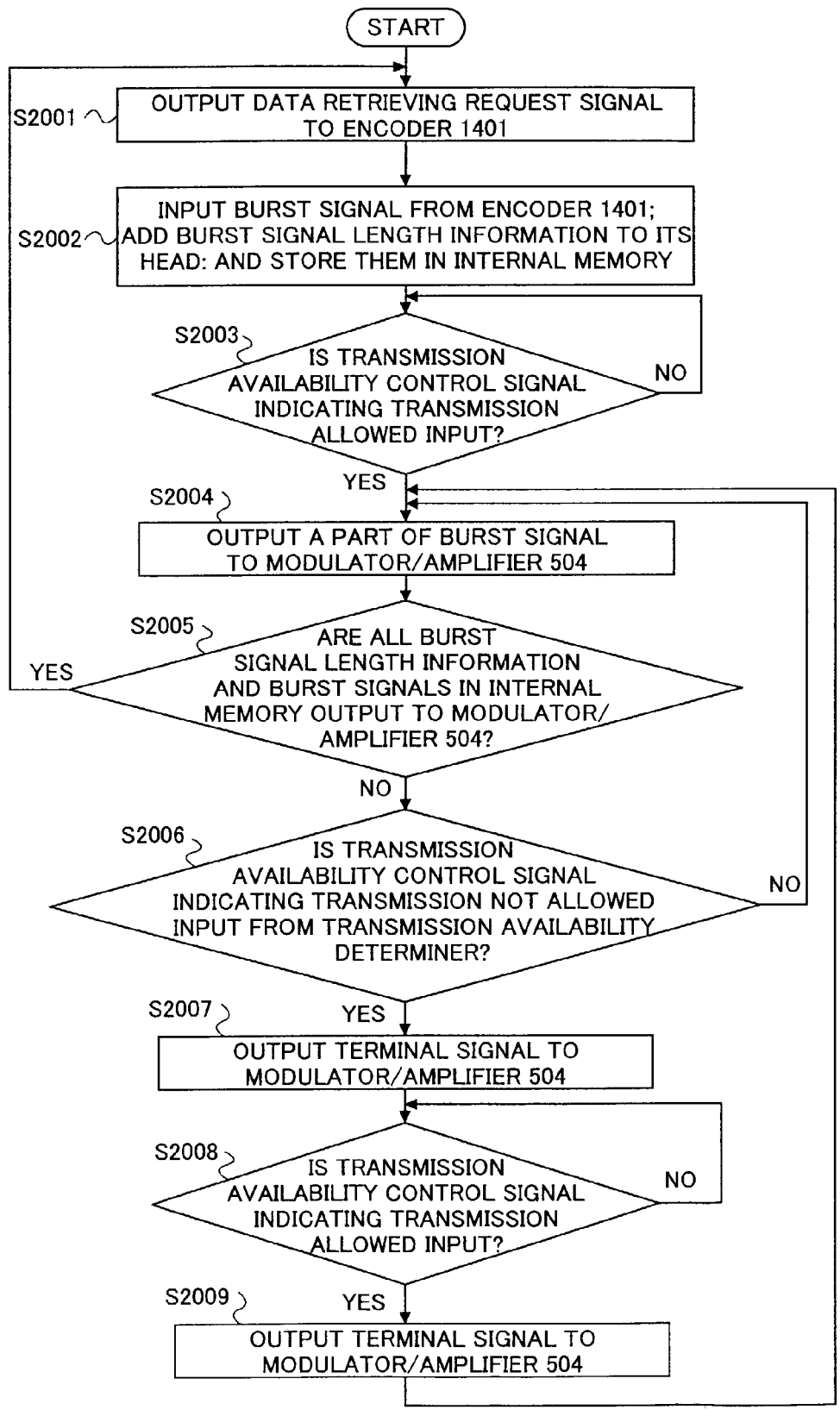
FIG. 20 is a flowchart showing an example of a process in a data retriever/divider according to the seventh embodiment of the present invention.

The seventh embodiment of the present invention is now described with reference to FIGS. 18–20. This embodiment is intended to implement the above-described first aspect. This embodiment has configuration similar to the one of the fourth embodiment, however it is intended not to determine or set the transmission unit length, but to divide and/or combine the burst signals adaptively for the transmission available period in order to transmit the burst signals from when the transmission path condition becomes fine until when it becomes not fine.

The control of this embodiment is now outlined with reference to FIG. 18. FIG. 18 schematically shows the outline of the burst signal processing of this embodiment. It is here assumed that there is, for example, a burst signal 1801 as shown in FIG. 18(a). This embodiment employs modification of the above-described fifth aspect, that is, it adds only a burst signal length 1802 (corresponding to the data length 404 in FIG. 4) to the burst signal 1801 as the attachment information. The attachment information is thus simplified because, as detailed later, the transmission unit length is not set and the burst signals are not divided or combined.

It is here assumed that the transmission available periods, where it is determined that the radio transmission path condition is fine, are defined as periods 1803a–1803c shown in FIG. 18(c). The burst signal 1801 is divided in conformity to the periods 1803a–1803c into the transmission units 1804a–1804c as shown in FIG. 18(d). Then, the transmission unit 1804a, the transmission unit 1804b, and the transmission unit 1804c are respectively transmitted during the period 1803a (from $t_{11}$ to $t_{12}$) the period 1803b (from $t_{13}$ to $t_{14}$), and the period 1803c (from $t_{15}$ to $t_{16}$).

In this case, in connection with the transmission available period used for the burst signal transmission, terminal signals 1805 are transmitted at the end of the transmission available period ($t_{12}$ and $t_{14}$ in the example shown) and the beginning of the transmission available period ($t_{13}$ and $t_{15}$ in the example shown) The terminal signal 1805 representing that the burst signal is cut along the way, may be, for example, characterized in arrangement of data and distinguished from the burst signal 1801 and the burst signal length 1802. The terminal signal can inform the receiving station that there is a following transmission unit. Alternatively, a pair of the terminal signals to be coupled in order to recover the original burst signal (the pair of the terminal signals 1805a and 1805b, and the pair of the terminal signals 1805c and 1805d, in the example shown) may be distinguished from other pairs.

The configuration of the communication terminal of this embodiment is now described with reference to FIG. 19. FIG. 19 schematically shows the configuration of the communication terminal 1900 serving as the transmitting station included in the radio transmission system according to this embodiment. Components similar to the ones of the transmitting station of the fourth embodiment (i.e. the communication terminal 1400 in FIG. 14) have consistent reference numbers, and are not detailed here for convenience.

The transmission availability controller 1901 of this embodiment includes only the transmission availability determiner 511, and a data retriever/divider 1902 having a memory capable of internally storing data. The data retriever/divider 1902 retrieves the burst signal from the encoder/interleaver 1401, and divides and outputs it to the modulator/amplifier 504, on the basis of the transmission availability control signal that is output from the transmission availability determiner 511.

The transmission availability control of this embodiment is now described with reference to FIG. 20. FIG. 20 shows an example of the process-flow in the data retriever/divider 1902 of this embodiment.

Upon starting the process, the data retriever/divider 1902 outputs the data retrieving request signal to the encoder/interleaver 1401 (S2001). Upon the burst signal from the encoder/interleaver 1401 being input, the data retriever/divider 1902 adds the burst signal length 1802 (c.f. FIG. 18) information to the head of the burst signal, and stores the burst signal and the burst signal length information added thereto in the internal memory (S2002).

The data retriever/divider 1902 then waits for the transmission availability control signal input from the transmission availability determiner 511 (S2003). If it is input, the data retriever/divider 1902 outputs only a portion of untransmitted part of the burst signal and the burst signal length information added thereto (hereinafter collectively referred to as a burst signal) stored in the internal memory to the modulator/amplifier 504 (S2004). This portion may be defined in units of, for example, a symbol, a bit, or a slot, and may be set arbitrarily.

It is then determined whether all burst signals stored in the internal memory are output to the modulator/amplifier 504 or not (S2005). If so, the procedure goes back to S2001, and enters into the process for the next burst signal.

If the burst signal still remains in the internal memory ("NO" at S2005), the data retriever/divider 1902 then waits for the transmission availability control signal indicating transmission not allowed that is input from the transmission availability determiner 511 (S2006). If there is no indication of transmission not allowed ("NO" at S2006), the procedure goes back to S2004, and the data retriever/divider 1902 outputs the next portion.

If the transmission availability control signal indicates that the transmission is not allowed ("YES" at S2006), the data retriever/divider 1902 suspends outputting the burst signals to the modulator/amplifier 504 at that time, and also outputs the terminal signal to the modulator/amplifier 504 in order to inform the receiving station that the transmission is suspended along the way of one burst signal (S2007).

Subsequently, while the transmission is suspended, the data retriever/divider 1902 waits for the transmission availability control signal indicating that the transmission is allowed, which is input from the transmission availability determiner 511 (S2008). If it is input, the data retriever/ divider 1902 again outputs the terminal signal to the modulator/amplifier 504 (S2009), and the procedure goes back to S2004 and continues the transmission process.

As described above, according to this embodiment, the transmission unit determination and setting processes can be dispensed with to use effectively the transmission available periods for the burst signal transmission.

Alternatively, this embodiment can be implemented along with the transmission availability control according to the above-described fourth aspect.

Figure 21:
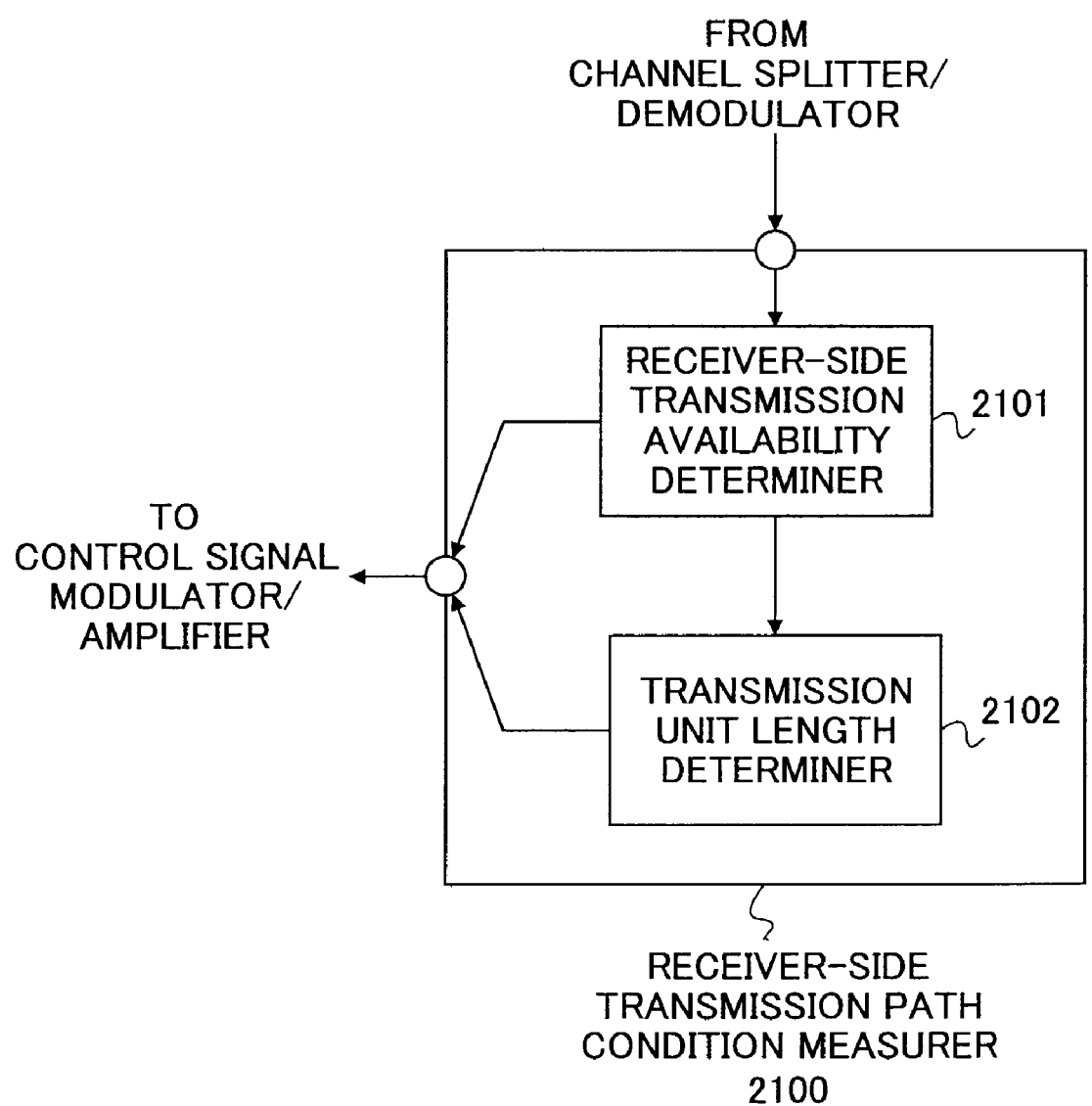
FIG. 21 is a block diagram schematically showing the configuration of a receiver-side transmission path condition measurer of a communication terminal serving as a receiving station in a radio transmission system according to an eighth embodiment of the present invention.

The eighth embodiment of the present invention is now described with reference to FIG. 21. This embodiment has configuration similar to any one of the configurations of the first through seventh embodiments, however it is intended that the receiving station determines the radio transmission path condition and transmits it to the transmitting station. FIG. 21 schematically shows an example of the configuration of the receiver-side transmission path condition measurer of the communication terminal 2100 serving as the receiving station included in the radio transmission system of this embodiment.

The receiver-side transmission path condition measurer 2100 includes a receiver-side transmission availability determiner 2101, and a transmission unit length determiner 2102.

The receiver-side transmission availability determiner 2101 calculates, on the basis of the radio transmission path condition information that is output from the channel splitter/demodulator, the time-average information such as the median of the short-term receiving power, and the instantaneous information such as the instantaneous receiving power. If the instantaneous condition is better than the time-average condition, the receiver-side transmission availability determiner 2101 generates the transmission availability control signal indicating that the transmission is allowed, while it generates the transmission availability control signal indicating that the transmission is not allowed in the other cases. The receiver-side transmission availability determiner 2101 then outputs each control signal to both of the control signal modulator/amplifier and the transmission unit length determiner 2102.

The transmission unit length determiner 2102, which may have the same configuration and operation as any one of the transmission unit length determiners of the above-described embodiments, determines the transmission unit length on the basis of the transmission availability control signal that is output from the receiver-side transmission availability determiner 2101, and outputs the transmission unit length indication signal indicating the determined transmission unit length to the control signal modulator/amplifier.

The control signal modulator/amplifier radio-transmits each input signal to the transmitting station as a transmission path condition measured at the receiver-side, and determined or provisionally-determined transmission availability control signal and transmission unit length. The transmitting station utilizes the received information determined by the receiving station as a parameter for the transmission availability control. The transmitting station may perform the control on the basis of only the information from the receiving station,-or of both the receiver-side information and the transmitter-side information.

As described above, according to this embodiment, since the transmission availability control signal indicating transmission allowed or transmission not allowed and the transmission unit length are determined or provisionally-determined at the receiving station, and. are provided to the transmitting station, information to be transmitted to the transmitting station can be reduced compared with the case in which all information of the transmission path condition has to be transmitted. In particular, this effect can be enhanced in the case in which the information is transmitted only when the transmission availability that the transmission availability control signal indicates is changed.

If the information of the transmission path conditions of a plurality of the transmitting stations are input to the receiver-side transmission path condition measurer 2100, a transmitting and receiving system can be easily made that allows, among the plurality of transmitting stations, only ones staying under the fine transmission path condition to transmit the burst signal.

Alternatively, only one kind of information from the above-described information (the transmission availability control signal indicating the transmission allowed or the transmission not allowed, and the transmission unit length) may be transmitted.

Also, in the case in which the transmitting station performs the transmission availability control on the basis of only the receiver-side information, the transmitting station may dispense with components and/or functionality to determine such information.

As described above, according to the first through eighth embodiments of the present invention, in the burst signal transmission availability control, transmitting the burst signal under the circumstances that the transmission path condition in not fine can be avoided.

In the division/combination process in every above embodiment, by performing only the division process, transmitting the burst signal under the circumstances that the transmission path condition is not fine can be avoided. However, by performing the combination process together, the transmission available period can be utilized more effectively, enabling an increase in the efficiency of transmission. Of course, only the combination process may be performed under the circumstances that the burst signal length is always shorter than the transmission unit length.

The present invention is not limited to the specifically disclosed embodiments, and variations and modifications may be made without departing from the scope of the invention.

What is claimed is:

1. A method of transmitting burst signals in a radio communication system having a transmitting station and a receiving station, the transmitting station employing a measurement part for measuring a radio transmission path condition between the transmitting station and the receiving station, the method comprising:

determining at the transmitting station, on the basis of the measured result, whether or not the burst signal transmission is available; and suspending the transmission, even on the way, when it is determined that the burst signal transmission is unavailable, in order to adjust the signal length of the burst signal to be transmitted.

2. A method of transmitting burst signals in a radio communication system having a transmitting station and a receiving station, the transmitting station employing a measurement part for measuring a radio transmission path condition between the transmitting station and the receiving station, the method comprising:

adjusting the signal length of the burst signal to be transmitted on the basis of the radio transmission path condition measured by the measurement part from the transmitting station; and comparing the measured result with a predetermined criteria from the transmitting station, and suspends adjusting the signal length of the burst signal to be transmitted when a cycle on which the compared result changes is shorter than a predetermined value or longer than another predetermined value.

3. A radio communication system having a transmitting station and a receiving station, the transmitting station employing a measurement part for measuring a radio transmission path condition between the transmitting station and the receiving station, the transmitting station comprising:
 a transmission availability determination part configured to determine transmission availability of a burst signal on the basis of the measured result by the measurement part;
 a signal length adjustment part configured to adjust the signal length of the burst signal to be transmitted; and
 a transmission part configured to transmit the burst signal, whose signal length is adjusted by the signal length adjustment part, to the receiving station on the basis of the determination by the transmission availability determination part.

4. The radio communication system as claimed in claim 3, the transmitting station further comprising:
 a transmission unit length determination part configured to determine a transmission unit length appropriate for a predetermined criteria, and wherein:
 the signal length adjustment part adjusts the signal length of the burst signal to be transmitted on the basis of the transmission unit length determined by the transmission unit length determination part.

5. A radio communication system having a transmitting station and a receiving station, the receiving station comprising:
 a measurement part configured to measure radio transmission path condition between the transmitting station and the receiving station; and
 a transmission part configured to transmit the measured result by the measurement part to the transmitting station, and the transmitting station comprising:
 a signal length adjustment part configured to adjust the signal length of a burst signal to be transmitted;
 a transmission availability determination part configured to determine transmission availability of the burst signal on the basis of the measured result received from the measurement part; and
 a transmission part configured to transmit the burst signal, whose signal length is adjusted by the signal length adjustment part, to the receiving station on the basis of the determination by the transmission availability determination part.

6. The radio communication system as claimed in claim 5, the receiving station further comprising:
 a comparison part configured to compare the measured result obtained by the measurement part with a predetermined criteria, and wherein:
 the transmission part transmits at least one of the measured result and the compared result obtained by the comparison part to the transmitting station; and
 the signal length adjustment part of the transmitting station adjusts the signal length of the burst signal to be transmitted on the basis of the compared result when the compared result is received from the receiving station.

7. The radio communication system as claimed in claim 6, the receiving station further comprising:
 a selection part configured to select a transmission unit from a plurality of transmission units having predetermined different lengths on the basis of the compared result obtained from the comparison part, and wherein:
 the transmission part transmits at least one of the measured result, the compared result, and the transmission unit selected by the selection part to the transmitting station; and
 the signal length adjustment part of the transmitting station adjusts the signal length of the burst signal to be transmitted, when the transmission unit is received from the receiving station, on the basis of the transmission unit.

8. The radio communication system as claimed in claim 3, wherein:
 the signal length adjustment part comprises a division/combination part for dividing or combining the burst signal to be transmitted into a signal or signals that satisfies or satisfy a predetermined criteria.

9. The radio communication system as claimed in claim 3, the transmitting station further comprising:
 an information retrieving part configured to obtain at least one of information related to amount of data of the burst signal to be transmitted, information related to transmission waiting time, and data type of information included in the burst signal to be transmitted; and wherein:
 the signal length adjustment part adjusts the signal length of the burst signal to be transmitted on the basis of the measured result and the information obtained by the information retrieving part.

10. The radio communication system as claimed in claim 3, the transmitting station further comprising;
 an encode/interleave part configured to perform at least one of encoding and interleaving processes in units of the burst signal on the burst signal to be transmitted before the signal length adjustment part adjusts its signal length.

11. A radio communication system having a transmitting station and a receiving station, the transmitting station employing a measurement part for measuring a radio transmission path condition between the transmitting station and the receiving station, the transmitting station comprising:
 a transmission availability determination part configured to determine transmission availability of the burst signal on the basis of the measured result obtained by the measurement part; and
 a transmission part configured to transmit the burst signal to be transmitted to the receiving station on the basis of the determination by the transmission availability determination part, and wherein:
 the transmission part suspends the burst signal transmission, even on the way, when it is determined that the burst signal transmission is unavailable by the transmission availability determination part.

12. A communication terminal having a measurement part for measuring a radio transmission path condition between the communication terminal and an opposing station communicating with it, the communication terminal comprising:
 a transmission availability determination part configured to determine transmission availability of a burst signal on the basis of the measured result by the measurement part;
 a signal length adjustment part configured to adjust the signal length of the burst signal to be transmitted; and
 a transmission part configured to transmit the burst signal, whose signal length is adjusted by the signal length adjustment part, to the opposing station on the basis of the determination by the transmission availability determination part.

13. The communication terminal as claimed in claim 12, the communication terminal further comprising:
a transmission unit length determination part configured to determine a transmission unit length appropriate for a predetermined criteria, and wherein:
the signal length adjustment part adjusts the signal length of the burst signal to be transmitted on the basis of the transmission unit length determined by the transmission unit length determination part.

14. The communication terminal as claimed in claim 13, wherein:
the signal length adjustment part comprises a division/combination part for dividing or combining the burst signal to be transmitted into a signal or signals that satisfies or satisfy a predetermined criteria.

15. The communication terminal as claimed in claim 13, the communication terminal further comprising:
an information retrieving part configured to obtain at least one of information related to amount of data of the burst signal to be transmitted, information related to transmission waiting time, and data type of information included in the burst signal to be transmitted, and wherein:
the signal length adjustment part adjusts the signal length of the burst signal to be transmitted on the basis of the measured result and the information obtained by the information retrieving part.

16. The communication terminal as claimed in claim 13, the communication terminal further comprising:
an encode/interleave part configured to perform at least one of encoding and interleaving processes in units of the burst signal on the burst signal to be transmitted before the signal length adjustment part adjusts its signal length.

17. A communication terminal having a measurement part for measuring a radio transmission path condition between the communication terminal and an opposing station communicating with respect thereto, the communication terminal comprising:
a transmission availability determination part configured to determine transmission availability of the burst signal on the basis of the measured result obtained by the measurement part; and
a transmission part configured to transmit the burst signal to be transmitted to the receiving station on the basis of the determination by the transmission availability determination part, and wherein:
the transmission part suspends the burst signal transmission, even on the way, when it is determined that the burst signal transmission is unavailable by the transmission availability determination part.

* * * * *